(12) United States Patent
Kanno et al.

(10) Patent No.: US 12,704,795 B2
(45) Date of Patent: Aug. 11, 2026

(54) FINE PARTICLE CONTAINING SILICON AND TONER

(71) Applicant: CANON KABUSHIKI KAISHA, Tokyo (JP)

(72) Inventors: Ichiro Kanno, Chiba (JP); Hayato Ida, Ibaraki (JP); Hiroki Watanabe, Chiba (JP); Mari Kaburagi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 18/169,053

(22) Filed: Feb. 14, 2023

(65) Prior Publication Data

US 2023/0257526 A1 Aug. 17, 2023

(30) Foreign Application Priority Data

Feb. 16, 2022 (JP) ................................ 2022-021764
Jan. 12, 2023 (JP) ................................ 2023-002946

(51) Int. Cl.
*G03G 9/097* (2006.01)
*C08G 77/04* (2006.01)
*C08J 7/06* (2006.01)

(52) U.S. Cl.
CPC ....... *G03G 9/09775* (2013.01); *C08G 77/045* (2013.01); *C08J 7/065* (2013.01); *C08J 2383/04* (2013.01)

(58) Field of Classification Search
CPC .............. G03G 9/09775; C08G 77/045; C08J 2383/04
See application file for complete search history.

(56) References Cited

U.S. PATENT DOCUMENTS

2011/0142893 A1* 6/2011 Ishikawa ................ A61K 8/585 556/463
2020/0209771 A1* 7/2020 Hashimoto .......... G03G 9/0825

FOREIGN PATENT DOCUMENTS

AU 2011232772 A1 * 8/2012 ........... G03G 9/0806
JP 2007099582 A 4/2007
JP 2016138035 A 8/2016
JP WO2015107961 A1 3/2017

* cited by examiner

*Primary Examiner* — Peter L Vajda
*Assistant Examiner* — Jenna Kuipers
(74) *Attorney, Agent, or Firm* — Canon U.S.A., Inc. IP Division

(57) ABSTRACT

The present disclosure provides a fine particle containing silicon, wherein the fine particle has a number-average particle diameter of a primary particle of 0.05 μm or more and 0.20 μm or less, wherein the fine particle contains a silicon atom at a ratio of 20% or more with respect to all elements in measurement by X-ray fluorescence.

8 Claims, 1 Drawing Sheet

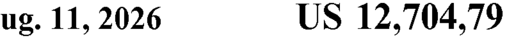
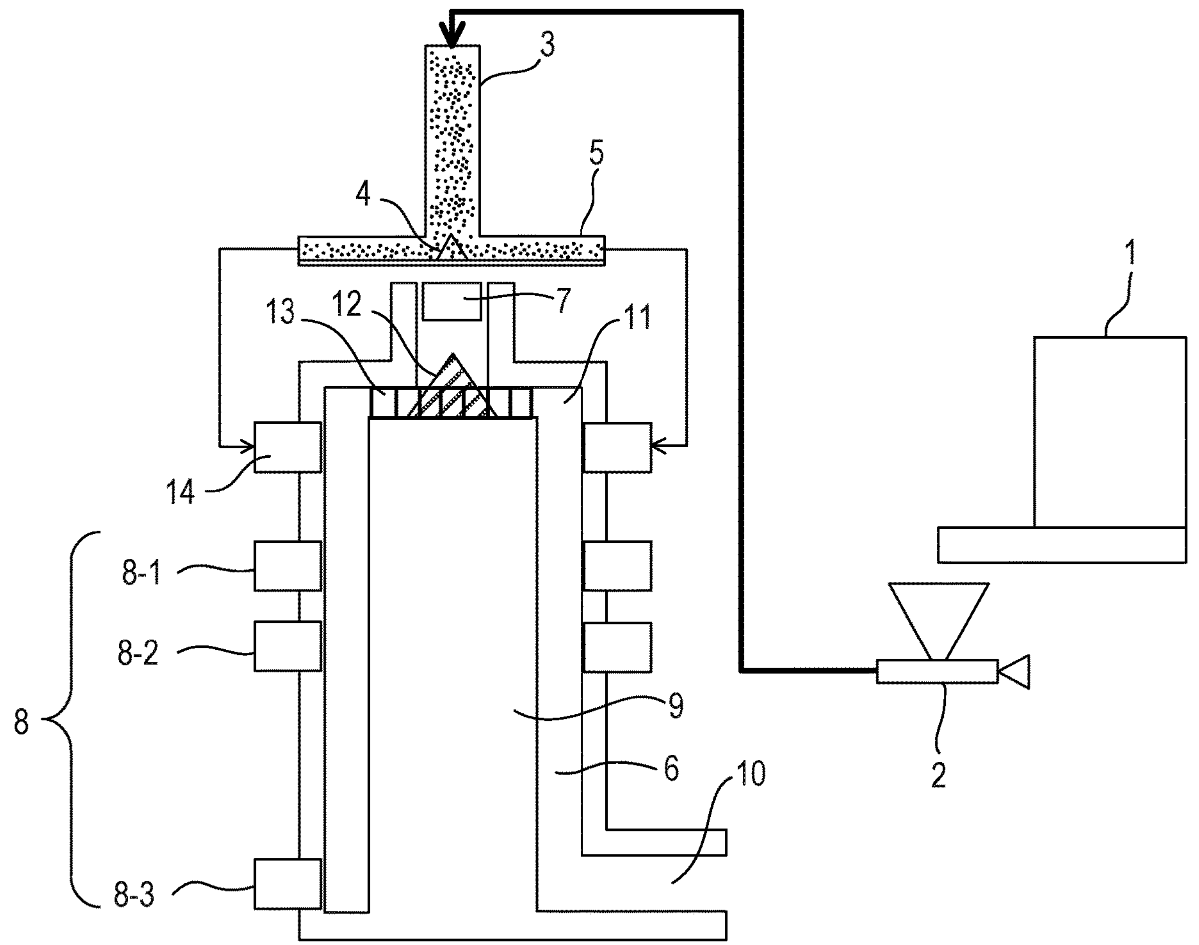
3
5
4
1
7
13
12
11
14
8-1
8-2
8
9
6
10
2
8-3

FINE PARTICLE CONTAINING SILICON AND TONER

BACKGROUND

Field of the Disclosure

The present disclosure relates to a fine particle containing silicon, and a toner to be used in an electrophotographic system.

Description of the Related Art

In recent years, along with widespread use of an electrophotographic full-color copying machine, a toner used for electrophotography has been increasingly required to respond to an increase in printing speed and to have environmental stability and a longer life.

In general, silica has hitherto been widely known as an external additive used in a toner, and there has been reported an example in which silica obtained by a dry method or a wet method (sol-gel method) was subjected to surface treatment to enhance its hydrophobicity. For example, in Japanese Patent Application Laid-Open No. 2007-99582, there is a disclosure of an example in which highly hydrophobic spherical sol-gel silica fine particles were added to toner base particles to improve the charging stability of a toner.

In addition, in Japanese Patent Application Laid-Open No. 2016-138035, there is a disclosure of an example in which discoloration and density unevenness were suppressed through use of silica particles treated with silicone oil.

In addition, in Japanese Patent No. 6116711, there is a disclosure of an example in which polyalkylsilsesquioxane fine particles were added to toner base particles to improve the fluidity and charging stability of a toner.

Related-art silica particles have high chargeability and are liable to cause a non-uniform charging distribution on the surface of a toner when externally added to the toner. For this reason, when an image is output on embossed paper or rough paper with large irregularities on the surface of the paper, the transferability of the toner is insufficient, and density unevenness may occur. In addition, under the condition that an extremely large stress is applied to the toner, for example, when a large number of low print ratio images are output, the color tone of the image may be fluctuated. Thus, there has still been room for improvement from the viewpoints of the charging stability and durable stability of the toner (Japanese Patent Application Laid-Open No. 2007-99582 and Japanese Patent Application Laid-Open No. 2016-138035). In addition, when images are output over a long period of time, an external additive present on the surface of the toner may be transferred to a carrier or a member in a main body of an image output apparatus, and cause an image defect (Japanese Patent No. 6116711). Further, when the toner in a developing machine is frequently replaced, for example, when a large number of high print ratio images are output, the influence therefrom becomes strong.

As described above, in the related art, there has been room for improvement from the viewpoints of the charging stability and durable stability of the external additive in the case of outputting an image through use of paper with large irregularities or in the case of outputting a large number of high print ratio images.

SUMMARY OF THE DISCLOSURE

An object of the present disclosure is to provide a fine particle and a toner that solve the above-mentioned problems. Specifically, an object of the present disclosure is to improve the charging stability and durable stability of the toner and reduce the contamination of a member, to thereby stably obtain an image of high quality over a long period of time.

The present disclosure relates to a fine particle containing silicon, wherein the fine particle has a number-average particle diameter of a primary particle of 0.05 μm or more and 0.20 μm or less, wherein the fine particle contains a silicon atom at a ratio of 20% or more with respect to all elements in measurement by X-ray fluorescence (XRF), and wherein, regarding a ratio of the silicon atom measured under etching the fine particle by irradiation with an Ar-Kα ray in analysis by X-ray photoelectron spectroscopy (XPS), when a ratio of a silicon atom having the following structure (a) is represented by X, and a sum of ratios of silicon atoms having the following structures (b) to (d) is represented by Y, (i) a relationship of X<Y is always satisfied in a measurement range of the following condition A, and (ii) there is a point at which the relationship of X<Y is changed to a relationship of X>Y, and the relationship of X>Y is always satisfied after the change, in a measurement range of the following condition B:

Condition A: a period of time starting with a time required for cutting a test piece made of PET by a depth of 2 nm by the irradiation with the Ar-Kα ray and ending with a time required for cutting the test piece by a depth of 20 nm:

Condition B: a period of time starting with the time required for cutting the test piece made of PET by a depth of 20 nm by the irradiation with the Ar-Kα ray and ending with a time required for cutting the test piece by a depth of 50 nm.

(a)

(b)

(c)

(d)

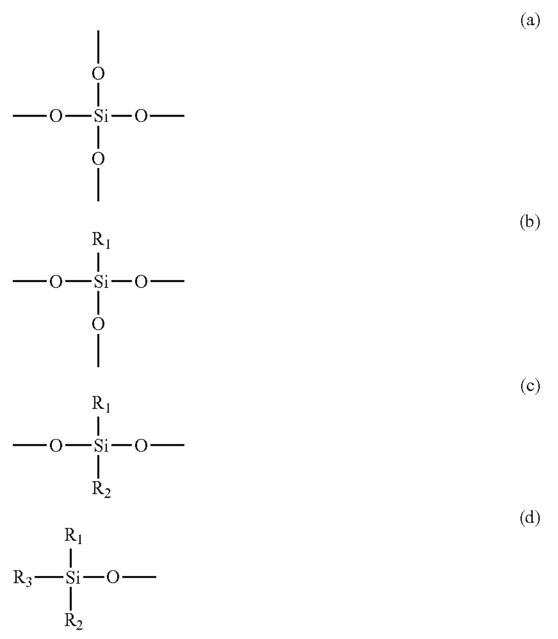

where $R_1$, $R_2$, and $R_3$ each independently represent a hydrocarbon group having 1 to 6 carbon atoms.

The present disclosure also relates to a toner including a toner particle and a fine particle, wherein the fine particle is a fine particle having the above-mentioned configuration.

Further features of the present disclosure will become apparent from the following description of exemplary embodiments with reference to the attached drawing.

BRIEF DESCRIPTION OF THE DRAWINGS

FIG. 1 is an explanatory view of a heat treatment apparatus suitable for controlling the sticking rate of a fine particle with respect to a toner particle.

DESCRIPTION OF THE EMBODIMENTS

In the present disclosure, the description "○○ or more and xx or less" or "from ○○ to xx" representing a numerical range means a numerical range including a lower limit and an upper limit that are end points unless otherwise stated.

The inventors of the present disclosure conceive that the mechanism via which the effect of the present disclosure is expressed is as described below.

Typical silica particles that have hitherto been used as an external additive for a toner are particles each containing a siloxane bond as a main component. The silica particles have high chargeability and are liable to cause a non-uniform charging distribution on the surface of the toner. In addition, related-art polyalkylsilsesquioxane particles can achieve a uniform charging distribution on the surface of the toner, but the polyalkylsilsesquioxane particles are liable to be deformed due to a low Young's modulus when receiving a stress from a member such as a carrier in a developing unit and may be separated from toner particles.

The inventors have made extensive investigations, and as a result, have found that, when the surface layer of a fine particle and the structure of the inside of the fine particle are optimized, the above-mentioned problems can be solved. Thus, the present disclosure has been achieved. Although the mechanism thereof is not clear, it is conceived that, when an alkyl group is introduced in a large amount into the surface layer of the fine particle, the charging distribution on the surface of the toner becomes uniform, and the flying property of the toner is increased to improve the transferability. In addition, it is presumed that, when the fine particle has appropriate hardness through the introduction of a large amount of a siloxane bond into the inside of the fine particle, the stress from outside can be alleviated to increase the sticking property of the fine particle with respect to the toner particle, to thereby suppress the transfer to a member, and the durable stability of the toner can be improved.

[Fine Particle]

A fine particle of the present disclosure is a fine particle containing silicon, wherein the fine particle has a number-average particle diameter of a primary particle of 0.05 μm or more and 0.20 μm or less, wherein the fine particle contains a silicon atom at a ratio of 20% or more with respect to all elements in measurement by X-ray fluorescence (XRF), and wherein, regarding a ratio of the silicon atom measured under etching the fine particle by irradiation with an Ar-Kα ray in analysis by X-ray photoelectron spectroscopy (XPS), when a ratio of a silicon atom having the following structure (a) is represented by X, and a sum of ratios of silicon atoms having the following structures (b) to (d) is represented by Y, (i) a relationship of X<Y is always satisfied in a measurement range of the following condition A, and (ii) there is a point at which the relationship of X<Y is changed to a relationship of X>Y, and the relationship of X>Y is always satisfied after the change, in a measurement range of the following condition B:

Condition A: a period of time starting with a time required for cutting a test piece made of PET (made of polyethylene terephthalate resin) by a depth of 2 nm by the irradiation with the Ar-Kα ray and ending with a time required for cutting the test piece by a depth of 20 nm;

Condition B: a period of time starting with the time required for cutting the test piece made of PET by a depth of 20 nm by the irradiation with the Ar-Kα ray and ending with a time required for cutting the test piece by a depth of 50 nm:

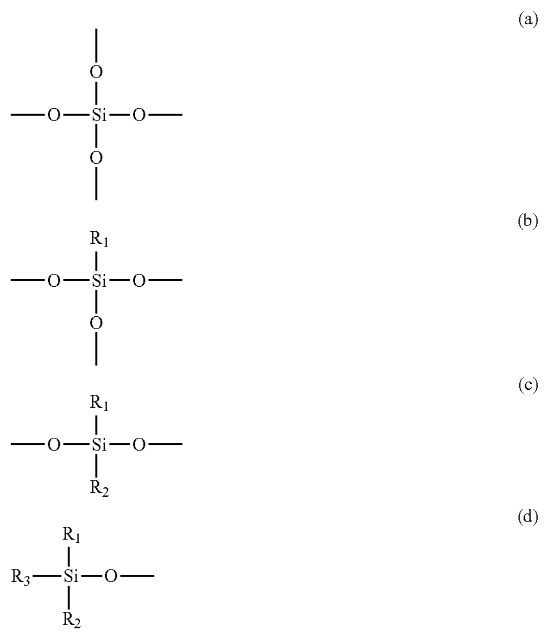

where $R_1$, $R_2$, and $R_3$ each independently represent a hydrocarbon group having 1 to 6 carbon atoms. The hydrocarbon group can be an alkyl group.

When the X and the Y do not always satisfy the relationship of X<Y in the measurement range of the condition A, the chargeability on the surface of the fine particle becomes too high, and hence an improving effect on the transferability cannot be obtained. In addition, when there is no point at which the X and the Y are changed from the relationship of X<Y to the relationship of X>Y in the measurement range of the condition B, or when there is a point of change, but the relationship of X>Y is not always satisfied after the change in the measurement range of the condition B, the fine particle becomes too soft and hence may be separated from the toner due to the stress which the toner receives from a member. Accordingly, the contamination of the member by the fine particle cannot be suppressed, and an image of high quality cannot be obtained. The relationship between the X and the Y may be controlled by hydrolysis and condensation conditions (reaction temperature, reaction time, stirring time), a pH, the kind of a catalyst, and further the ratios of monomers to be added and the order of the addition of the monomers at the time of a reaction in a wet production method.

For example, the relationship of X<Y in the measurement range of the condition A is always satisfied by a method involving increasing the mixing ratio of a bifunctional silane monomer having the structure (c), a method involving gradually adding the bifunctional silane monomer having the structure (c) later, a method involving increasing the pH of a solution, or the like. The relationship of X>Y in the measurement range of the condition B is always satisfied by a method involving increasing the mixing ratio of a tetrafunctional silane monomer having the structure (a), a method involving increasing a temperature in a hydrolysis step, or the like.

A method of producing the fine particle is not particularly limited, but in one embodiment, the particle can be formed through the hydrolysis and polycondensation reaction of a silicon compound (silane monomer) by a sol-gel method. Specifically, the particle can be formed by polymerizing a mixture of a bifunctional silane having two siloxane bonds and a tetrafunctional silane having four siloxane bonds through hydrolysis and a polycondensation reaction. The silane monomers, such as the bifunctional silane and the tetrafunctional silane, are described later.

Specifically, the fine particle can be a polycondensate of at least one silicon compound selected from the group consisting of bifunctional silanes and at least one silicon compound selected from the group consisting of tetrafunctional silanes. The ratio of the bifunctional silane can be 30 mol % or more and 70 mol % or less, or 40 mol % or more and 60 mol % or less. The ratio of the tetrafunctional silane can be 30 mol % or more and 80 mol % or less or 40 mol % or more and 70 mol % or less.

The fine particle of the present disclosure includes a particle of a silicon polymer having a siloxane bond. The particle of the silicon polymer contains the silicon polymer in an amount of 90% by mass or more, or 95% by mass or more.

A method of producing the silicon polymer particle is not particularly limited, and the silicon polymer particle may be obtained, for example, by adding a silane compound dropwise onto water, subjecting the resultant to hydrolysis and a condensation reaction with a catalyst, and then filtering and drying the resultant suspension. The particle diameter of the silicon polymer particle may be controlled by the kind of a catalyst, a blending ratio, a reaction starting temperature, a dropping time, and the like. Examples of the catalyst include, but not limited to: acidic catalysts, such as hydrochloric acid, hydrofluoric acid, sulfuric acid, and nitric acid; and basic catalysts, such as ammonia water, sodium hydroxide, and potassium hydroxide.

In one embodiment, the silicon polymer particle can be produced by the following method. Specifically, the method can include: a first step of obtaining a hydrolysate of a silicon compound; a second step of mixing the hydrolysate with an alkaline aqueous medium to subject the hydrolysate to a polycondensation reaction; and a third step of mixing the polycondensation reaction product with an aqueous solution, followed by particle formation. In some cases, a hydrophobized spherical silicon polymer particle may be obtained by further blending a hydrophobizing agent into a spherical silicon polymer particle dispersion liquid.

In the first step, the silicon compound and the catalyst are brought into contact with each other by a method, such as stirring or mixing, in an aqueous solution in which an acidic or alkaline substance serving as a catalyst is dissolved in water. A known catalyst may be suitably used as the catalyst. Specific examples of the catalyst include: acid catalysts, such as acetic acid, hydrochloric acid, hydrofluoric acid, sulfuric acid, and nitric acid; and basic catalysts, such as ammonia water, sodium hydroxide, and potassium hydroxide.

The usage amount of the catalyst may be appropriately adjusted in accordance with the kinds of the silicon compound and the catalyst. The usage amount can be selected in a range of $1\times10^{-3}$ part by mass or more and 1 part by mass or less with respect to 100 parts by mass of water used in the hydrolysis of the silicon compound.

When the usage amount of the catalyst is $1\times10^{-3}$ part by mass or more, the reaction sufficiently proceeds. Meanwhile, when the usage amount of the catalyst is 1 part by mass or less, the concentration of the catalyst remaining as an impurity in the fine particle becomes low, and the hydrolysis can be easily performed. The usage amount of the water can be 2 mol or more and 15 mol or less with respect to 1 mol of the silicon compound. When the amount of the water is 2 mol or more, the hydrolysis reaction sufficiently proceeds. When the amount of the water is 15 mol or less, the productivity is improved.

The reaction temperature is not particularly limited, and the reaction may be performed at normal temperature or in a heated state. However, the reaction can be performed under a state in which the temperature is kept at from 10° C. to 60° C. because a hydrolysate is obtained in a short period of time, and the partial condensation reaction of the produced hydrolysate can be suppressed. The reaction time is not particularly limited and may be appropriately selected in consideration of the reactivity of the silicon compound to be used, the composition of a reaction liquid prepared by blending the silicon compound with an acid and water, and the productivity.

In the method of producing the silicon polymer particle, as the second step, the raw material solution obtained in the first step is mixed with an alkaline aqueous medium to subject a particle precursor to a polycondensation reaction. Thus, a polycondensation reaction liquid is obtained. Here, the alkaline aqueous medium is a liquid obtained by mixing an alkali component, water, and as required, an organic solvent and the like.

An alkali component used in the alkaline aqueous medium is an alkali component of which the aqueous solution exhibits basicity, and acts as a neutralizer for the catalyst used in the first step and as a catalyst for the polycondensation reaction in the second step. Examples of such alkali component may include: alkali metal hydroxides, such as lithium hydroxide, sodium hydroxide, and potassium hydroxide; ammonia; and organic amines, such as monomethylamine and dimethylamine.

The usage amount of the alkali component is such an amount that the alkali component neutralizes an acid and effectively acts as a catalyst for the polycondensation reaction. For example, when ammonia is used as the alkali component, its usage amount is usually selected in a range of 0.01 part by mass or more and 12.5 parts by mass or less with respect to 100 parts by mass of a mixture of the water and the organic solvent.

In the second step, in order to prepare the alkaline aqueous medium, the organic solvent may be further used in addition to the alkali component and the water. The organic solvent is not particularly limited as long as the organic solvent has compatibility with the water, and an organic solvent that dissolves 10 g or more of the water per 100 g at normal temperature and normal pressure is suitable.

Specific examples thereof include: alcohols, such as methanol, ethanol, n-propanol, 2-propanol, and butanol; polyhydric alcohols, such as ethylene glycol, diethylene glycol, propylene glycol, glycerin, trimethylolpropane, and hexanetriol; ethers, such as ethylene glycol monoethyl ether, diethyl ether, and tetrahydrofuran; amide compounds, such as dimethylformamide, dimethylacetamide, and N-methylpyrrolidone; acetone; and diacetone alcohol.

In one embodiment, of the organic solvents listed above, alcohol-based solvents, such as methanol, ethanol, 2-propanol, and butanol, can be used. Further, from the viewpoints of hydrolysis and a dehydration condensation reaction, the same alcohol can be selected as the organic solvent as an alcohol to be generated as an elimination product.

In the third step, the polycondensation reaction product obtained in the second step and an aqueous solution are mixed, followed by particle formation. Water (e.g., tap water or pure water) may be suitably used as the aqueous solution, but a component exhibiting compatibility with water, such as a salt, an acid, an alkali, an organic solvent, a surfactant, or a water-soluble polymer, may be further added to the water. The temperature of each of the polycondensation reaction liquid and the aqueous solution at the time of the mixing is not particularly restricted, and can be selected in a range of from 5° C. to 70° C. in consideration of the composition thereof, the productivity, and the like.

A known method may be used as a method of recovering the silicon polymer particle without any particular limitation. There are given, for example, a method involving scooping up floating powder and a filtration method. Of those, a filtration method can be used because its operation is simple. The filtration method is not particularly limited, and any known device for vacuum filtration, centrifugal filtration, or pressure filtration, or the like may be selected. Filter paper, a filter, a filter cloth, and the like used in the filtration are not particularly limited as long as they are industrially available, and may be appropriately selected in accordance with a device to be used.

The monomer to be used may be appropriately selected depending on, for example, compatibility with the solvent and the catalyst, or hydrolyzability. Examples of a tetrafunctional silane monomer capable of introducing the structure (a) include tetramethoxysilane, tetraethoxysilane, and tetraisocyanatosilane. In one embodiment, tetraethoxysilane is selected.

Examples of a trifunctional silane monomer capable of introducing the structure (b) include methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilane, ethyltriethoxysilane, ethyltrichlorosilane, ethyltriacetoxysilane, ethvltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, and phenyltrihydroxysilane. In one embodiment, methyltrimethoxysilane is selected.

Examples of a bifunctional silane monomer capable of introducing the structure (c) include di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethoxydimethylsilane, diethoxydimethylsilane, and diethyldimethoxysilane. In one embodiment, dimethyldimethoxysilane is selected.

Examples of a monofunctional silane monomer capable of introducing the structure (d) include t-butyldimethylchlorosilane, t-butyldimethylmethoxysilane, t-butyldimethylethoxysilane, t-butyldiphenylchlorosilane, t-butyldiphenylmethoxysilane, t-butyldiphenylethoxysilane, chlorodimethylphenylsilane, methoxydimethylphenylsilane, ethoxydimethylphenylsilane, chlorotrimethylsilane, methoxytrimethylsilane, ethoxytrimethylsilane, triethylmethoxysilane, triethylethoxysilane, tripropylmethoxysilane, tributylmethoxysilane, tripentylmethoxysilane, triphenylchlorosilane, triphenylmethoxysilane, and triphenylethoxysilane.

The fine particle of the present disclosure has a number-average particle diameter of a primary particle of 0.05 μm or more and 0.20 μm or less. When the number-average particle diameter of the primary particle falls within the above-mentioned range, the toner particle can be uniformly coated with the fine particle. In addition, the stress on the toner can be suppressed, and hence the effect of the charging stability is easily obtained. In the case where the number-average particle diameter of the primary particle of the fine particle is less than 0.05 μm, when images each having a low print density are output in a large number over a long period of time under a severe environment such as a high-temperature and high-humidity environment, the stress on the toner is increased, and hence there is a risk in that an external additive particle is liable to be embedded into the surface of the toner.

In addition, when the number-average particle diameter of the primary particle of the fine particle is more than 0.20 μm, there is a risk in that the fine particle is liable to be separated from the surface of the toner. The number-average particle diameter of the primary particle of the fine particle can be increased by lowering the reaction temperature, shortening the reaction time, and increasing the amount of the catalyst in each of the hydrolysis step and the polycondensation step. In addition, the number-average particle diameter of the primary particle of the fine particle can be decreased by increasing the reaction temperature, lengthening the reaction time, and decreasing the amount of the catalyst in each of the hydrolysis step and the polycondensation step.

The number-average particle diameter of the primary particle of the fine particle can be 0.07 μm or more and 0.18 μm or less, or can be 0.08 μm or more and 0.15 μm or less from the above-mentioned viewpoints.

The fine particle contains a silicon atom at a ratio of 20% or more with respect to all elements in measurement by X-ray fluorescence (XRF). When the ratio of the silicon atom with respect to all the elements falls within the above-mentioned range, the transferability and the durable stability are improved. When the ratio is less than 20%, the charge amount of the fine particle becomes too low, and hence the effect of the transferability is not easily obtained. The ratio of the silicon atom with respect to all the elements may be increased by increasing the mixing ratios of the silane monomers capable of introducing the structures (a) to (d). The ratio of the silicon atom with respect to all the elements may be decreased by decreasing the mixing ratios of the silane monomers capable of introducing the structures (a) to (d). The upper limit of the ratio of the silicon atom with respect to all the elements can be 50% or less from the viewpoint of the chargeability.

In the fine particle of the present disclosure, the X and the Y can satisfy a relationship of $0.20 \leq Y/(X+Y)$ at a point of time required for cutting a test piece made of PET by a depth of 50 nm by irradiation with an Ar-Kα ray. When the Y/(X+Y) falls within the above-mentioned range, the fine particle has appropriate elasticity, and hence the durable stability is further improved. The value of the Y/(X+Y) may be controlled by the mixing ratios of the silane monomers having the structures (a) to (d). For example, the Y/(X+Y) may be increased by increasing the mixing ratios of the silane monomers capable of introducing the structures (b) to (d) or decreasing the mixing ratio of the silane monomer capable of introducing the structure (a). In addition, the Y/(X+Y) may be decreased by decreasing the mixing ratios of the silane monomers capable of introducing the structures (b) to (d) or increasing the mixing ratio of the silane monomer capable of introducing the structure (a). The Y/(X+Y) satisfies a relationship of $0.20 \leq Y/(X+Y) \leq 0.40$, or $0.20 \leq Y/(X+Y) \leq 0.30$.

In the fine particle of the present disclosure, the X and the Y can satisfy a relationship of $1.2 \leq X/Y \leq 2.0$ at a point of time required for cutting a test piece made of PET by a depth of 50 nm by irradiation with an Ar-Kα ray. When the X/Y falls within the above-mentioned range, the fine particle has appropriate elasticity, and hence the durable stability is further improved. The value of the X/Y may be controlled by the mixing ratios of the silane monomers capable of introducing the structures (a) to (d). For example, the X/Y may be increased by decreasing the mixing ratios of the silane monomers capable of introducing the structures (b) to (d) or increasing the mixing ratio of the silane monomer having the structure (a). In addition, the X/Y may be decreased by increasing the mixing ratios of the silane monomers capable of introducing the structures (b) to (d) or decreasing the mixing ratio of the silane monomer capable of introducing the structure (a). Further, the X/Y can satisfy a relationship of $1.2 \leq X/Y \leq 1.8$.

In one embodiment, the fine particle of the present disclosure can have a Young's modulus of 10 GPa or more and 30 GPa or less. In the case where the Young's modulus falls within the above-mentioned range, when the toner receives a stress from a member such as a carrier, the stress is alleviated, and the embedding of the fine particle into the surface of the toner particle can be further suppressed.

In the case where the Young's modulus is 10 GPa or more, when the toner receives a stress from a member such as a carrier, the fine particle itself is less liable to be fractured. In addition, in the case where the Young's modulus is 30 GPa or less, when the toner receives a stress from a member such as a carrier, the stress is easily alleviated, and the embedding of the fine particle into the surface of the toner particle can be further suppressed. Accordingly, the state of the toner surface is less liable to be changed, and a change in charging of the toner can be further suppressed.

The Young's modulus of the fine particle may be controlled by changing the mixing ratios of the above-mentioned monomers, and the temperature, the time, the pH, and the kind of the catalyst in each of the hydrolysis step and the polycondensation step. For example, the Young's modulus may be increased by increasing the mixing ratio of the silane monomer capable of introducing the structure (a), decreasing the mixing ratios of the silane monomers capable of introducing the structures (b) to (d), increasing the temperature in each of the hydrolysis step and the polycondensation step, lengthening the time of each of the hydrolysis step and the polycondensation step, increasing the pH in each of the hydrolysis step and the polycondensation step, or the like. The Young's modulus may be decreased by decreasing the mixing ratio of the silane monomer capable of introducing the structure (a), increasing the mixing ratios of the silane monomers capable of introducing the structures (b) to (d), lowering the temperature in each of the hydrolysis step and the polycondensation step, shortening the time of each of the hydrolysis step and the polycondensation step, decreasing the pH of each of the hydrolysis step and the polycondensation step, or the like. The Young's modulus of the fine particle can be 13 GPa or more and 20 GPa or less.

In one embodiment, the surface of the fine particle of the present disclosure can be subjected to surface treatment with a hydrophobic treatment agent. That is, the fine particle can be a particle of a silicon polymer subjected to surface treatment with a hydrophobic treatment agent. The hydrophobic treatment agent is not particularly limited but can be an organosilicon compound.

Examples thereof may include: alkylsilazane compounds such as hexamethyldisilazane; alkylalkoxysilane compounds, such as diethyldiethoxysilane, trimethylmethoxysilane, methyltrimethoxysilane, and butyltrimethoxysilane; fluoroalkylsilane compounds such as trifluoropropyltrimethoxysilane; chlorosilane compounds, such as dimethyldichlorosilane and trimethylchlorosilane; siloxane compounds such as octamethylcyclotetrasiloxane; silicon oil; and silicon varnish.

Through the hydrophobic treatment of the surface of the fine particle, a change in charge amount of the toner under the high-temperature and high-humidity environment can be further suppressed. In particular, the fine particle can be subjected to surface treatment with at least one compound selected from the group consisting of: an alkylsilazane compound; an alkylalkoxysilane compound; a chlorosilane compound; a siloxane compound; and silicone oil. Further, the fine particle can be subjected to surface treatment with the alkylsilazane compound from the viewpoint of the charging stability under the high-temperature and high-humidity environment.

The degree of hydrophobicity of the fine particle by a methanol titration method can be 50% or more and 60% or less from the viewpoint of the charging stability under the high-temperature and high-humidity environment. The degree of hydrophobicity can be 53% or more and 58% or less.

In one embodiment, in a chart obtained by $^{29}$Si-NMR measurement of the fine particle of the present disclosure, when a total peak area assigned to a silicon polymer is represented by SA, a peak area assigned to the following structure (a) is represented by S4, a peak area assigned to the following structure (b) is represented by S3, and a peak area assigned to the following structure (c) is represented by S2, the SA, the S2, the S3, and the S4 can satisfy the following expressions (I) to (III).

$$0.30 \leq S4/SA \leq 0.80 \quad \text{(I)}$$

$$0 \leq S3/SA \leq 0.50 \quad \text{(II)}$$

$$0.20 \leq S2/SA \leq 0.70 \quad \text{(III)}$$

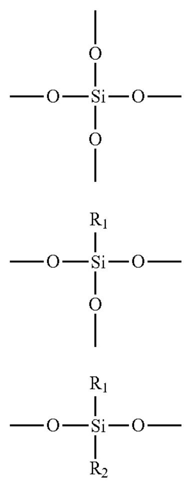

(a)

(b)

(c)

where $R_1$ and $R_2$ each independently represent a hydrocarbon group having 1 to 6 carbon atoms.

In the above-mentioned ranges, when the toner receives a stress from a member such as a carrier, the embedding of the fine particle into the surface of the toner particle and the fracture of the fine particle itself can be suppressed. Further, the relationships of $0.40 \leq S4/SA \leq 0.70$, $0 \leq S3/SA \leq 0.10$, and $0.30 \leq S2/SA \leq 0.60$ can be satisfied from the viewpoints of the transferability, charging stability, and durable stability of the toner because the amount of Si—$CH_3$ present in the fine particle becomes optimum.

When the fine particle of the present disclosure is used as an external additive for a toner, the content of the fine particle in the toner base particle can be 0.1 part by mass or more and 20.0 parts by mass or less with respect to 100 parts by mass of the toner base particle from the viewpoint of the charging stability. Further, the content can be 0.5 part by mass or more and 15.0 parts by mass or less, or can be 1.0 part by mass or more and 10.0 parts by mass or less.

In the case where the content of the external additive for a toner is less than 0.1 part by mass, when images each having a low print density are output in a large number over a long period of time under a severe environment such as a high-temperature and high-humidity environment, the stress on the toner cannot be suppressed, and improving effects on the durable stability and the charging stability are not easily obtained.

In addition, in the case where the content of the fine particle is more than 20.0 parts by mass, when images each having a high print density are output for a long period of time, there is a risk in that filming of an external additive particle onto a carrier or a photosensitive member may occur.

[Toner Particle]

Next, the configuration of a toner particle to which the above-mentioned fine particle of the present disclosure is externally added is described in detail.

<Binder Resin>

A binder resin used in the toner of the present disclosure is not particularly limited, and the following polymers or resins may be used.

For example, there may be used: homopolymers of styrene and substituted products thereof, such as polystyrene, poly-p-chlorostyrene, and polyvinyltoluene; styrene-based copolymers, such as a styrene-p-chlorostyrene copolymer, a styrene-vinyltoluene copolymer, a styrene-vinylnaphthalene copolymer, a styrene-acrylic acid ester copolymer, a styrene-methacrylic acid ester copolymer, a styrene-α-chloromethyl methacrylate copolymer, a styrene-acrylonitrile copolymer, a styrene-vinyl methyl ether copolymer, a styrene-vinyl ethyl ether copolymer, a styrene-vinyl methyl ketone copolymer, and a styrene-acrylonitrile-indene copolymer; polyvinyl chloride: a phenol resin; a natural modified phenol resin; a natural resin modified maleic acid resin; an acrylic resin; a methacrylic resin; polyvinyl acetate; a silicon resin; a polyester resin; polyurethane: a polyamide resin; a furan resin; an epoxy resin; a xylene resin; polyvinylbutyral; a terpene resin: a coumarone-indene resin; and a petroleum-based resin. Of those, a polyester resin can be selected from the viewpoints of the durable stability and the charging stability.

In addition, the acid value of the polyester resin can be 0.5 mgKOH/g or more and 40 mgKOH/g or less from the viewpoints of the environmental stability and the charging stability. The acid value in the polyester resin and Si—$CH_3$ in the fine particle interact with each other. Thus, the durability and the chargeability of the toner under the high-temperature and high-humidity environment can be further improved. The acid value can be 1 mgKOH/g or more and 20 mgKOH/g or less, or 1 mgKOH/g or more and 15 mgKOH/g or less.

<Colorant>

A colorant may be used as required in the toner of the present disclosure. Examples of the colorant include the following.

As a black colorant, there are given, for example: carbon black; and a colorant toned to a black color with a yellow colorant, a magenta colorant, and a cyan colorant. Although a pigment may be used alone as the colorant, a dye and the pigment can be used in combination to improve the clarity of the colorant in terms of the quality of a full-color image.

As a pigment for a magenta toner, there are given, for example: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, or 282; C.I. Pigment Violet 19; and C.I. Vat Red 1, 2, 10, 13, 15, 23, 29, or 35.

As a dye for a magenta toner, there are given, for example: oil-soluble dyes, such as: C.I. Solvent Red 1, 3, 8, 23, 24, 25, 27, 30, 49, 81, 82, 83, 84, 100, 109, or 121; C.I. Disperse Red 9; C.I. Solvent Violet 8, 13, 14, 21, or 27; and C.I. Disperse Violet 1; and basic dyes, such as: C.I. Basic Red 1, 2, 9, 12, 13, 14, 15, 17, 18, 22, 23, 24, 27, 29, 32, 34, 35, 36, 37, 38, 39, or 40; and C.I. Basic Violet 1, 3, 7, 10, 14, 15, 21, 25, 26, 27, or 28.

As a pigment for a cyan toner, there are given, for example C.I. Pigment Blue 2, 3, 15:2, 15:3, 15:4, 16, or 17; C.I. Vat Blue 6; C.I. Acid Blue 45; and a copper phthalocyanine pigment in which a phthalocyanine skeleton is substituted by 1 to 5 phthalimidomethyl groups.

As a dye for a cyan toner, for example, C.I. Solvent Blue 70 is given.

As a pigment for a yellow toner, there are given, for example: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, or 185; and C.I. Vat Yellow 1, 3, or 20.

As a dye for a yellow toner, for example, C.I. Solvent Yellow 162 is given.

The content of the colorant can be 0.1 part by mass or more and 30.0 parts by mass or less with respect to 100 parts by mass of the binder resin.

<Wax>

A wax may be used as required in the toner of the present disclosure. Examples of the wax include the following.

Hydrocarbon-based waxes, such as microcrystalline wax, paraffin wax, and Fischer-Tropsch wax, oxidized products of hydrocarbon-based waxes such as oxidized polyethylene wax, or block copolymers thereof; waxes each containing a fatty acid ester as a main component, such as caranuba wax; and waxes obtained by partially or wholly deacidifying fatty acid esters, such as deacidified caranuba wax.

Further, the examples include the following: saturated linear fatty acids, such as palmitic acid, stearic acid, and montanic acid; unsaturated fatty acids, such as brassidic acid, eleostearic acid, and parinaric acid; saturated alcohols, such as stearyl alcohol, aralkyl alcohol, behenyl alcohol, carnaubyl alcohol, ceryl alcohol, and melissyl alcohol; polyhydric alcohols such as sorbitol; esters of fatty acids, such as palmitic acid, stearic acid, behenic acid, and montanic acid, and alcohols, such as stearyl alcohol, aralkyl alcohol, behenyl alcohol, carnaubyl alcohol, ceryl alcohol, and melissyl alcohol: fatty acid amides, such as linoleamide, oleamide, and lauramide; saturated fatty acid bisamides, such as methylene bis stearamide, ethylene bis capramide, ethylene bis lauramide, and hexamethylene bis stearamide; unsaturated fatty acid amides, such as ethylene bis oleamide, hexamethylene bis oleamide, N,N'-dioleyladipamide, and N,N'-dioleylsebacamide; aromatic bisamides, such as m-xylenebisstearamide and N,N'-distearylisophthalamide: fatty acid metal salts (generally called metal soaps), such as calcium stearate, calcium laurate, zinc stearate, and magnesium stearate; waxes each obtained by grafting a vinyl-based monomer, such as styrene or acrylic acid, to an aliphatic hydrocarbon-based wax: partially esterified products of fatty acids and polyhydric alcohols, such as behenic acid monoglyceride; and methyl ester compounds each having a hydroxy group obtained by hydrogenation of a plant oil and fat.

The content of the wax is can be 2.0 parts by mass or more and 30.0 parts by mass or less with respect to 100 parts by mass of the binder resin.

<Charge Control Agent>

A charge control agent may be incorporated into the toner of the present disclosure as required. Although a known charge control agent may be utilized as the charge control agent to be incorporated into the toner, a metal compound of an aromatic carboxylic acid can be used because the compound is colorless, increases the charging speed of the toner, and can stably hold a constant charge quantity.

As a negative charge control agent, there are given, for example: a salicylic acid metal compound; a naphthoic acid metal compound: a dicarboxylic acid metal compound: a polymer-type compound having a sulfonic acid or a carboxylic acid in a side chain thereof: a polymer-type compound having a sulfonate or a sulfonic acid esterified product in a side chain thereof; a polymer-type compound having a carboxylate or a carboxylic acid esterified product in a side chain thereof: a boron compound; a urea compound: a silicon compound; and a calixarene. The charge control agent may be internally added to the toner particle, or may be externally added thereto.

The addition amount of the charge control agent can be 0.2 part by mass or more and 10.0 parts by mass or less with respect to 100 parts by mass of the binder resin.

<Inorganic Fine Powder>

In the toner of the present disclosure, in addition to the above-mentioned fine particle, another inorganic fine powder may be used in combination as required. The inorganic fine powder may be internally added to the toner particle or may be mixed with the toner base particle as an external additive. As the external additive, inorganic fine powder such as silica can be used. The inorganic fine powder can be hydrophobized with a hydrophobizing agent such as a silane compound, silicone oil, or a mixture thereof.

As an external additive for improving the fluidity, inorganic fine powder having a specific surface area of 50 $m^2/g$ or more and 400 $m^2/g$ or less can be used. An inorganic fine particle having a specific surface area in the above-mentioned range may be used in combination in order to achieve both the improvement of the fluidity and the stabilization of the durability. The inorganic fine powder can be used in an amount of 0.1 part by mass or more and 10.0 parts by mass or less with respect to 100 parts by mass of the toner particle. When the above-mentioned range is satisfied, the effect of the charging stability is easily obtained.

<Developer>

The toner of the present disclosure, which may be used as a one-component developer, can be used as a two-component developer by being mixed with a magnetic carrier for further improving its dot reproducibility because a stable image can be obtained over a long time period. That is, a two-component developer containing a toner and a magnetic carrier, in which the toner is the toner of the present disclosure can be used.

Examples of the magnetic carrier that may be used include generally known magnetic carriers, including: surface-oxidized iron powder or unoxidized iron powder; particles of metals, such as iron, lithium, calcium, magnesium, nickel, copper, zinc, cobalt, manganese, chromium, and a rare earth; particles of alloys thereof; particles of oxides thereof; magnetic materials such as ferrite; and magnetic material-dispersed resin carriers (so-called resin carriers) each containing a magnetic material and a binder resin holding the magnetic material under a state in which the magnetic material is dispersed therein.

When the toner is mixed with the magnetic carrier to be used as a two-component developer, satisfactory results are usually obtained by setting the carrier mixing ratio at that time, as a toner concentration in the two-component developer, to 2% by mass or more and 15% by mass or less, or to 4% by mass or more and 13% by mass or less.

<Method of Producing Toner Particle and Method of Producing Toner>

A method of producing the toner particle is not particularly limited, and a conventionally known production method, such as a suspension polymerization method, an emulsion aggregation method, a melt-kneading method, or a dissolution suspension method, may be adopted.

The toner may be obtained by mixing the resultant toner particle with an inorganic fine particle, and as required, any other external additive. The mixing of the toner particle with the inorganic fine particle and the other external additive may be performed with a mixing apparatus, such as a double cone mixer, a V-type mixer, a drum-type mixer, a super mixer, a Henschel mixer, a Nauta mixer, and MECHANO HYBRID (manufactured by Nippon Coke & Engineering Co., Ltd.), or NOBILTA (manufactured by Hosokawa Micron Corporation).

In order to control the sticking rate of the fine particle with respect to the toner particle based on a water-washing method, the fine particle can be mixed with the toner particle to obtain a toner particle mixture, followed by heat treatment. That is, the method of producing a toner can include: a mixing step of mixing the toner particle with the fine particle to provide a toner particle mixture; and a heat treatment step of subjecting the toner particle mixture to heat treatment. The sticking rate of the fine particle can be improved by performing the heat treatment step. The sticking rate of the fine particle with respect to the toner particle (sticking rate of the fine particle based on the water-washing method) can be 50% or more. In the case where the sticking rate of the fine particle falls within the above-mentioned range, even when images are output in a large number over a long period of time, the durable stability and the charging stability are further improved because the fine particle is not easily separated from the toner. In addition, even when printing is performed for a long period of time under an environment in which the toner is excessively charged, such as a low-humidity environment, the fine particle is not easily separated from the toner, and hence the excess charging of the toner is suppressed, with the result that an improving effect on the transferability is further obtained. Further, the sticking rate can be 70% or more. The upper limit of the sticking rate is not particularly limited, but it can be 99% or less, or 95% or less. The sticking rate of the fine particle with respect to the toner particle may be controlled by the temperature of hot air in the heat treatment step.

For example, the heat treatment may be performed with hot air through use of a heat treatment apparatus illustrated in FIG. 1.

The heat treatment apparatus includes: a treatment chamber 6 for subjecting the toner particle mixture to heat treatment; a toner particle mixture supply unit for supplying the toner particle mixture to the treatment chamber 6: a hot air supply unit 7 for supplying hot air for subjecting the toner particle mixture supplied from the toner particle mixture supply unit to heat treatment; and a recovery unit 10 for discharging the toner particle subjected to heat treatment outside of the treatment chamber 6 from a discharge port formed in the treatment chamber 6 and recovering the toner particle subjected to heat treatment.

The heat treatment apparatus illustrated in FIG. 1 further includes a regulating unit 9 as a columnar member, and the treatment chamber 6 has a cylindrical shape covering the outer peripheral surface of the regulating unit 9. The hot air supply unit 7 is provided on one end portion side of the cylindrical shape of the treatment chamber 6 so that the hot air flows while rotating in the treatment chamber 6 having a cylindrical shape. In addition, a toner particle mixture supply unit includes a plurality of supply tubes 5 provided on the outer periphery of the treatment chamber 6.

Further, the discharge port provided in the treatment chamber 6 is provided on the outer periphery of an end portion of the treatment chamber 6 on a side opposite to the side on which the hot air supply unit 7 is provided so as to be present on an extension line in a rotational direction of the toner particle mixture. The heat treatment using the heat treatment apparatus having the above-mentioned configuration is described below.

The toner particle mixture supplied in a constant amount by a raw material constant amount supply unit 1 is introduced into an introduction tube 3 provided on the vertical line of the raw material constant amount supply unit 1 by a compressed gas adjusted by a compressed gas flow rate-adjusting unit 2. The mixture that has passed through the introduction tube is uniformly dispersed by a protruding member 4 of a conical shape provided in the central portion of the introduction tube 3, is introduced into the supply tubes 5 radially spreading in 8 directions, and is introduced into the treatment chamber 6 where heat treatment is performed.

At this time, the flow of the mixture supplied to the treatment chamber 6 is regulated by the regulating unit 9 for regulating the flow of the mixture, the unit being provided in the treatment chamber 6. Accordingly, the mixture supplied to the treatment chamber 6 is heat-treated while swirling in the treatment chamber 6, and is then cooled.

Heat for heat-treating the supplied mixture is supplied from the hot air supply unit 7, and is distributed by a distributing member 12, and hot air is introduced into the treatment chamber 6 while being caused to swirl spirally by a swirling member 13 for causing the hot air to swirl. With regard to such configuration, the swirling member 13 for causing the hot air to swirl has a plurality of blades, and can control the swirling of the hot air in accordance with the number and angles of the blades. The hot air is supplied from a hot air supply unit outlet 11.

The toner particle subjected to heat treatment is cooled with cold air supplied from cold air supply units 8 (cold air supply units 8-1, 8-2, and 8-3).

Next, the cooled toner particle is recovered by the recovery unit 10 present at the lower end of the treatment chamber. The recovery unit has a configuration in which a blower (not shown) is provided at its tip, and the particle is sucked and conveyed by the blower.

In addition, a powder particle supply port 14 is provided so that the swirling direction of the supplied mixture and the swirling direction of the hot air may be the same direction, and the recovery unit 10 of a heat spheronization apparatus is provided in the outer peripheral portion of the treatment chamber so as to maintain the swirling direction of a powder particle that have been caused to swirl. Further, the cold air supplied from the cold air supply units 8 is configured to be supplied from the outer peripheral portion of the apparatus to the inner peripheral surface of the treatment chamber from horizontal and tangential directions.

After the heat-treated toner particle is obtained, the heat-treated toner particle may be mixed with various external additives. A mixing apparatus, such as a double cone mixer, a V-type mixer, a drum-type mixer, a super mixer, a Henschel mixer, a Nauta mixer, MECHANO HYBRID (manufactured by Nippon Coke & Engineering Co., Ltd.), or NOBILTA (manufactured by Hosokawa Micron Corporation), may be used as a mixing apparatus.

[Methods of Measuring Various Physical Properties]

Methods of measuring various physical properties are described below.

<Separation of Fine Particle and Toner Particle from Toner>

The respective physical properties may be measured through use of fine particles separated from a toner by the following methods. To 100 mL of ion-exchanged water, 200 g of sucrose (manufactured by Kishida Chemical Co., Ltd.) is added and the sucrose is dissolved in the ion-exchanged water under heating with hot water to prepare a sucrose syrup. Into a tube for centrifugation, 31 g of the sucrose syrup and 6 mL of Contaminon N (10% by mass aqueous solution of a neutral detergent for washing a precision measuring device formed of a nonionic surfactant, an anionic surfactant, and an organic builder, and having a pH of 7, manufactured by Fujifilm Wako Pure Chemical Corporation) are put to prepare a dispersion liquid. To the dispersion liquid, 1 g of a toner is added and toner clumps are loosened with a spatula or the like.

The tube for centrifugation is shaken in the above-mentioned shaker under the condition of 350 reciprocations per minute for 20 minutes. After the shaking, the solution is transferred to a glass tube (50 mL) for a swing rotor and centrifuged under the conditions of 3,500 rpm for 30 minutes in a centrifuge. In the glass tube after the centrifugation, the toner is present in a top layer, and the fine particles are present on the aqueous solution side of a lower layer. The aqueous solution in the lower layer is collected and centrifuged to be separated into the sucrose and the fine particles, to thereby collect the fine particles. As required, the centrifugation is repeated to perform separation sufficiently, and then the dispersion liquid is dried and the fine particles are collected.

When a plurality of kinds of fine particles are added, the fine particles of the present disclosure may be sorted through use of a centrifugation method or the like.

<Method of Measuring Number-Average Particle Diameter of Primary Particle of Fine Particle>

The number-average particle diameter of the primary particle of the fine particle may be determined by measurement using a centrifugal sedimentation method. Specifically, 0.01 g of dried external additive particles are loaded into a 25 mL glass vial, and 0.2 g of a 5% Triton solution and 19.8 g of RO water are added to the vial, to thereby prepare a solution. Next, a probe (tip end in a tip end) of an ultrasonic disperser is immersed in the solution, and ultrasonic dispersion is performed at an output power of 20 W for 15 minutes, to thereby provide a dispersion liquid. Subsequently, the number-average particle diameter of the primary particle is measured by a centrifugal sedimentation particle size distribution measuring device DC24000 of CPS Instruments, Inc. through use of the dispersion liquid. The number of revolutions of a disc is set to 18,000 rpm, and a true density is set to 1.3 g/cm$^3$. Before the measurement, the device is calibrated through use of polyvinyl chloride particles having an average particle diameter of 0.476 μm.

<Method of Measuring Acid Value of Binder Resin>

The acid value is the number of milligrams of potassium hydroxide required for neutralizing acid components, such as a free fatty acid and a resin acid, contained in 1 g of a sample. The acid value is measured in conformity with JIS-K0070-1992 as described below (1) Reagents Phenolphthalein solution is provided by dissolving 1.0 g of phenolphthalein in 90 mL of ethyl alcohol (95% by volume), and adding ion-exchanged water to make a total of 100 mL.

Special-grade potassium hydroxide 7 g is dissolved in 5 mL of water, and ethyl alcohol (95% by volume) is added to make a total of 1 L. The resultant is placed in an alkali-resistant container so as not to be brought into contact with a carbon dioxide gas or the like, and is left to stand therein for 3 days, followed by filtration to provide a potassium hydroxide solution. The resultant potassium hydroxide solution is stored in an alkali-resistant container. The factor of the potassium hydroxide solution is determined from the amount of the potassium hydroxide solution required for neutralization when 25 mL of 0.1 mol/L hydrochloric acid is taken in an Erlenmeyer flask and a few drops of the phenolphthalein solution are added, followed by titration with the potassium hydroxide solution. The 0.1 mol/L hydrochloric acid to be used is produced in conformity with JIS K 8001-1998.

(2) Operations (A) Main Test

A pulverized sample 2.0 g is precisely weighed in a 200 mL Erlenmeyer flask, and 100 mL of a mixed solution of toluene/ethanol (2:1) is added to dissolve the sample over 5 hours. Then, a few drops of the phenolphthalein solution are added as an indicator, and titration is performed with the potassium hydroxide solution. The endpoint of the titration is defined as the point where a pale pink color of the indicator persists for about 30 seconds.

(B) Blank Test

Titration is performed in the same manner as in the above-mentioned operation except that no sample is used (that is, only the mixed solution of toluene/ethanol (2:1) is used).

(3) The Acid Value is Calculated by Substituting the Obtained Results into the Following Equation:

$$A=[(C-B)\times f\times 5.61]/S$$

where A represents the acid value (mgKOH/g), B represents the addition amount (mL) of the potassium hydroxide solution in the blank test, C represents the addition amount (mL) of the potassium hydroxide solution in the main test, "f" represents the factor of the potassium hydroxide solution, and S represents the mass (g) of the sample.

<Measurement of Acid Value of Polyester Resin from Toner>

The following method may be used as a method of measuring the acid value of a polyester resin from a toner. A polyester resin is separated from a toner and measured for an acid value by the following method.

A toner is dissolved in tetrahydrofuran (THF), and the solvent is evaporated under reduced pressure from the resultant soluble matter, to thereby provide a tetrahydrofuran (THF)-soluble component of the toner.

The resultant tetrahydrofuran (THF)-soluble component of the toner is dissolved in chloroform to prepare a sample solution having a concentration of 25 mg/mL.

The resultant sample solution 3.5 mL is injected into the following device, and a component having a molecular weight of 2,000 or more is fractionated as a resin component under the following conditions.

Preparative GPC apparatus: Preparative HPLC Model LC-980, manufactured by Japan Analytical Industry Co., Ltd.

Preparative column: JAIGEL 3H. JAIGEL 5H (manufactured by Japan Analytical Industry Co., Ltd.)

Eluent: chloroform

Flow rate: 3.5 mL/min

After the high-molecular-weight component derived from the resin is fractionated, the solvent is evaporated under reduced pressure. The resultant is further dried under reduced pressure in an atmosphere of 90° C. for 24 hours. The above-mentioned operation is repeated until about 2.0 g of the resin component is obtained. An acid value is measured in accordance with the above-mentioned procedure through use of the resultant sample.

<Method of Measuring Weight-Average Particle Diameter (D4) of Toner Particle>

The weight-average particle diameter (D4) of the toner particle is calculated by measurement and analyzing measurement data with the number of effective measurement channels of 25,000 by using a precision particle size distribution-measuring apparatus based on a pore electrical resistance method provided with a 100 μm aperture tube "Coulter Counter Multisizer 3" (trademark, manufactured by Beckman Coulter, Inc.) and dedicated software included therewith "Beckman Coulter Multisizer 3 Version 3.51" (manufactured by Beckman Coulter, Inc.) for setting measurement conditions and analyzing measurement data.

An electrolyte aqueous solution prepared by dissolving special-grade sodium chloride in ion-exchanged water so as to have a concentration of about 1% by mass, such as "ISOTON II" (manufactured by Beckman Coulter, Inc.), may be used in the measurement.

The dedicated software is set as described below prior to the measurement and the analysis.

In the "change standard measurement method (SOM)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter, Inc.) is set as a Kd value. A threshold and a noise level are automatically set by pressing a threshold/noise level measurement button. In addition, a current is set to 1,600 μA, a gain is set to 2, and an electrolyte solution is set to ISOTON II, and a check mark is placed in a check box as to whether the aperture tube is flushed after the measurement.

In the "setting for conversion from pulse to particle diameter" screen of the dedicated software, a bin interval is set to a logarithmic particle diameter, the number of particle diameter bins is set to 256, and a particle diameter range is set to the range of 2 μm or more and 60 μm or less.

A specific measurement method is as described below.

(1) About 200 mL of the electrolyte aqueous solution is charged into a 250 mL round-bottom beaker made of glass dedicated for the Multisizer 3. The beaker is set in a sample stand, and the electrolyte aqueous solution in the beaker is stirred with a stirrer rod at 24 rotations/sec in a counterclockwise direction. Then, dirt and bubbles in the aperture tube are removed by the "aperture tube flush" function of the dedicated software.

(2) About 30 mL of the electrolyte aqueous solution is charged into a 100 ml flat-bottom beaker made of glass. About 0.3 mL of a diluted solution prepared by diluting "Contaminon N" (a 10% by mass aqueous solution of a neutral detergent for washing a precision measuring device formed of a nonionic surfactant, an anionic surfactant, and an organic builder and having a pH of 7, manufactured by Fujifilm Wako Pure Chemical Corporation) with ion-exchanged water by three mass fold is added as a dispersant to the electrolyte aqueous solution.

(3) A predetermined amount of ion-exchanged water is charged into the water tank of an ultrasonic dispersing unit "Ultrasonic Dispersion System Tetora 150" (manufactured by Nikkaki Bios Co., Ltd.) having an electrical output of 120 W in which two oscillators each having an oscillatory frequency of 50 kHz are built so as to be out of phase by 180°. About 2 mL of the Contaminon N is charged into the water tank.

(4) The beaker in the section (2) is set in the beaker fixing hole of the ultrasonic dispersing unit, and the ultrasonic dispersing unit is operated. Then, the height position of the beaker is adjusted so that the resonance state of the liquid level of the electrolyte aqueous solution in the beaker is maximized.

(5) About 10 mg of a toner is gradually added to and dispersed in the electrolyte aqueous solution in the beaker in the section (4) under a state in which the electrolyte aqueous solution is irradiated with the ultrasonic wave. Then, the ultrasonic dispersion treatment is continued for an additional 60 seconds. The temperature of water in the water tank is appropriately adjusted to 10° C. or more and 40° C. or less in the ultrasonic dispersion.

(6) The electrolyte aqueous solution in the section (5) in which the toner has been dispersed is added dropwise with a pipette to the round-bottom beaker in the section (1) placed in the sample stand, and the concentration of the toner to be measured is adjusted to about 5%. Then, measurement is performed until 50,000 particles are measured.

(7) The measurement data is analyzed with the dedicated software included with the apparatus, and the weight-average particle diameter (D4) is calculated. An "average diameter" on the "analysis/volume statistics (arithmetic mean)" screen of the dedicated software when the dedicated software is set to show the "graph/% by volume" is the weight-average particle diameter (D4).

<Method of Measuring Young's Modulus of Fine Particle>

The Young's modulus of the fine particle is determined by a microcompression test using Hysitron PI 85L PicoIndenter (manufactured by Bruker Corporation).

The Young's modulus (MPa) is calculated from the slope of a profile (load displacement curve) of a displacement (nm) and a test force (μN) obtained by measurement.

Device and Jig

Base system: Hysitron PI 85L

Measurement indenter: circular flat-end indenter having a diameter of 1 μm

Used SEM: Thermo Fisher Versa 3D

SEM conditions: −10° tilt, 13 pA at 10 keV

Measurement Conditions

Measurement mode: displacement control

Maximum displacement: 30 nm

Displacement rate: 1 nm/sec

Retention time: 2 sec

Unloading time: 5 nm/sec

Analysis Method

The Hertz analysis is applied to a curve obtained at the time of compression by from 0 nm to 10 nm in the resultant load displacement curve, to thereby calculate the Young's modulus of the fine particles.

Sample Preparation

Fine Particles Adhering to a Silicon Wafer

<Method of Measuring Sticking Rate of Fine Particle>

A method for measuring the sticking rate of the fine particles is described. First, the fine particles contained in the toner before water-washing treatment are quantified. The intensity of a Si element in the toner is measured through use of a wavelength dispersion-type X-ray fluorescence analyzer "Axios advanced" (manufactured by PANalytical Corporation). Then, in the same manner, the intensity of a Si element in the toner after the following water-washing treatment is measured. The sticking rate (%) may be calculated by the following equation.

Sticking rate (%)=(Intensity of Si element in toner after water-washing treatment/Intensity of Si element in toner before water-washing treatment)×100

The conditions for the water-washing treatment are described below.

(Water-Washing Treatment Step)

A sucrose aqueous solution in which 20.7 g of sucrose (manufactured by Kishida Chemical Co., Ltd.) is dissolved in 10.3 g of ion-exchanged water and 6 mL of Contaminon N (neutral detergent for washing a precision measuring device formed of a nonionic surfactant, an anionic surfactant, and an organic builder, and having a pH of 7) serving as a surfactant are put in a 30 mL glass vial and sufficiently mixed, to thereby prepare a dispersion liquid. In addition, as the glass vial, for example, VCV-30 having an outer diameter of 35 mm and a height of 70 mm, manufactured by Nichiden-Rika Glass Co., Ltd., may be used. To the dispersion liquid, 1.0 g of a toner is added and left to stand still until the toner is settled out, to thereby prepare a dispersion liquid before treatment. The dispersion liquid before treatment is shaken with a shaker (YS-8D type: manufactured by Yayoi Co., Ltd.) at a shaking speed of 200 rpm for 5 minutes, to thereby separate fine particles from the surfaces of the toner particles. Through this operation, the fine particles weakly adhering to the surfaces of the toner particles are separated from the surfaces of the toner particles, but the fine particles strongly adhering to the surfaces of the toner particles remain on the surfaces of the toner particles. Separation between the toner particles in which part of the fine particles remain on the surfaces and the separated fine particles is performed with a centrifuge. A centrifugation operation is performed through use of a small tabletop centrifuge "H-19F" (manufactured by Kokusan Co., Ltd.) under the conditions of 3,700 rpm for 30 mm. After the centrifugation, the toner having the fine particles remaining thereon is collected by suction filtration, and dried to provide a toner after water washing.

<Method of Measuring Abundance Ratios S3/SA, S4/SA, and S2/SA of Constituent Compounds of Fine Particle by Solid-State $^{29}$Si-NMR>

In solid-state $^{29}$Si-NMR, peaks are detected in different shift regions depending on the structures of functional groups that are bonded to Si in constituent compounds of the fine particles. The structures that are bonded to Si may be identified by identifying each of peak positions through use of a standard sample. The abundance ratio of each of the constituent compounds may be calculated from the resultant peak area. The ratios of the peak areas of an M-unit structure, a D-unit structure, a T-unit structure, and a Q-unit structure to the total peak area can be determined by calculation.

Measurement conditions for solid-state $^{29}$Si-NMR are specifically as described below.

Apparatus: JNM-ECX5002 (JEOL RESONANCE)

Temperature: room temperature

Measurement method: DDMAS method 29Si 45°

Sample tube: zirconia 3.2 mmφ

Sample: loaded into a test tube under a powder state

Sample rotation speed: 10 kHz

Relaxation delay: 180 s

Scan: 2,000

After the measurement, a plurality of silane components having different substituents and linking groups in the sample are subjected to peak separation by curve fitting into the following M-unit structure, D-unit structure, T-unit structure, and Q-unit structure, and each peak area is calculated.

The curve fitting is performed through use of EXcalibur for Windows (trademark) version 4.2 (EX series) that is software for JNM-EX 400 manufactured by JEOL Ltd. "ID Pro" is clicked from menu icons to read measurement data. Next, "Curve fitting function" is selected from "Command" of a menu bar, and curve fitting is performed. Curve fitting for each component is performed so that the difference (synthetic peak difference) between a synthesized peak obtained by synthesizing each peak obtained by curve fitting and the peak of the measurement result becomes smallest.

M-unit structure: (Ra)(Rb)(Rc)Si—O— (S1')

D-unit structure: (Rd)(Re)Si(—O—)$_2$ (S2')

T-unit structure: RfSi(—O—)$_3$ (S3')

Q-unit structure: Si(—O—)$_4$ (S4')

The total peak area of the foregoing corresponding to a silicon polymer is represented by SA. That is, it is assumed that (S1'+S2'+S3'+S4')=SA.

Ra, Rb, Rc, Rd, Re, and Rf in the formulae (S1'), (S2'), and (S3') each represent a hydrocarbon group having 1 to 6 carbon atoms, which is bonded to silicon. The hydrocarbon group is can be an alkyl group.

A peak area S3 corresponding to the structure (a), a peak area S4 corresponding to the structure (b), and a peak area S2 corresponding to the structure (c) are calculated from the resultant peak areas. When it is required to recognize the structures in more detail, the measurement results of $^{13}$C-NMR and $^{1}$H-NMR may be identified together with the measurement results of $^{29}$Si-NMR. S3/SA, S4/SA, and S2/SA are calculated from SA, S2, S3, and S4 thus determined.

<Method of Measuring Degree of Hydrophobicity of Fine Particle>

The degree of hydrophobicity of the fine particles of the present disclosure is calculated by the methanol titration method. Specifically, the degree of hydrophobicity is measured by the following procedure. In a mixture liquid obtained by adding 0.5 g of external additive particles for a toner to 50 mL of RO water, methanol is added dropwise from a burette while the mixed liquid is stirred until the total amount of the external additive particles for a toner is moistened. Whether or not the total amount has been moistened is determined by whether or not all the fine particles floating on the water surface have been submerged and suspended in the liquid. In this case, the percentage value of methanol added dropwise with respect to the total amount of the mixed liquid and the methanol at the time of completion of the dropwise addition is defined as a degree of hydrophobicity. A higher value for a degree of hydrophobicity indicates higher hydrophobicity. The degree of hydrophobicity of the fine particles of the present disclosure can be 50% or more and 60% or less from the viewpoint of the charging stability. Further, the degree of hydrophobicity can be 53% or more and 58% or less.

<Method of Measuring Surface Treatment Agent of Fine Particle>

A surface treatment agent for the fine particles is analyzed by pyrolysis GC-MS (gas chromatography mass spectrometry).

Measurement conditions are specifically as described below.

Device: GC6890A (manufactured by Agilent Technologies Corporation), pyrolyzer (manufactured by Japan Analytical Industry Co., Ltd.)

Column: HP-5 ms 30 m

Pyrolysis temperature: 590° C.

The surface treatment agent for the fine particles is identified by identifying each peak position in a profile obtained by measurement through use of a standard sample.

<Method of Measuring Ratio of Silicon Atom in Fine Particle by X-Ray Fluorescence (XRF)>

The measurement of the ratio of silicon atoms in the fine particles is performed in conformity with JIS K0119-1969 specifically as described below.

A wavelength dispersion-type X-ray fluorescence analyzer "Axios" (manufactured by PANalytical Corporation) and dedicated software "SuperQ ver. 4.0F" (manufactured by PANalytical Corporation), which is included with the device, for setting measurement conditions and analyzing measurement data are used as a measuring device. Rh is used as an anode of an X-ray tube. A measurement atmosphere is set to a vacuum atmosphere. A measurement diameter (collimator mask diameter) is set to 10 mm, and a measurement time is set to 10 seconds. In addition, when light elements are measured, the elements are detected with a proportional counter (PC). When heavy elements are measured, the elements are detected with a scintillation counter (SC).

As a measurement sample, a pellet obtained by putting about 1 g of fine particles in a dedicated aluminum ring for pressing, flattening the fine particles, and pressuring the fine particles through use of a tablet forming compressor "BRE-32" (manufactured by Maekawa Testing Machine Mfg. Co., Ltd.) at 20 MPa for 300 seconds, to thereby form the fine particles into a thickness of about 2 mm and a diameter of about 20 mm is used.

The measurement is performed under the above-mentioned conditions, an element is identified based on the peak position of the resultant X-ray, and its concentration is calculated from a count rate (unit: cps) that is the number of X-ray photons per unit time. The formula for calculation is as described below.

Ratio of silicon atom in fine particle [%]=(content of silicon atom in fine particle [kcps])/(content of atoms in fine particle [kcps])×100

<Method of Measuring Ratio of Silicon Atom in Fine Particle by XPS>

The ratios of elements present in the fine particles are measured through use of XPS. The element concentration of a silicon element to be measured is represented by dSi, the element concentration of an oxygen atom is represented by dO, and the element concentration of a carbon atom is represented by dC, and a total thereof is assumed to be 100.0 atomic %. The concentration dSi in this case is calculated.

Measurement conditions for XPS are described below.

Apparatus: PHI 5000 VERSA PROBE II (ULVAC-PHI, Inc.)
Radiation ray: Al Kα ray
Output: 25 W 15 kV
Photoelectron acceptance angle: 450
Pass energy: 58.7 eV
Step size: 0.125 eV
XPS peak: C 1s, O 1s, Si 2p
GUN type: GCIB
Time: 10 min
Interval: 10 sec
Sputter setting: 5 kV A sample is set in a sample set hole having a diameter of 2 mm and a depth of 2 mm machined on an XPS dedicated platen.

As a measurement principle, photoelectrons are generated through use of an X-ray source, and energy based on an inherent scientific bond of a substance is measured. Monochromatized Al-Kα is used as an X-ray, and the measurement is performed under the above-mentioned conditions.

<Method of Measuring X and Y of Fine Particle by XPS>

X and Y in the fine particles are measured through use of XPS. The peak of the silicon element to be measured is separated into a peak derived from the X and a peak derived from the Y to determine the X and the Y.

Measurement conditions are as described below.

Apparatus: PHI 5000 VERSA PROBE II (ULVAC-PHI, Inc.)
Radiation ray: Al Kα ray
Output: 25 W 15 kV
Photoelectron acceptance angle: 450
Pass energy: 58.7 eV
Step size: 0.125 eV
XPS peak: C 1s, O 1s, Si 2p
GUN type: GCIB
Time: 10 min
Interval: 10 sec
Sputter setting: 5 kV A sample is set in a sample set hole having a diameter of 2 mm and a depth of 2 mm machined on an XPS dedicated platen.

As a measurement principle, photoelectrons are generated through use of an X-ray source, and energy based on an inherent scientific bond of a substance is measured. Monochromatized Al-Kα is used as an X-ray, and the measurement is performed under the above-mentioned conditions. Then, the total peak area of the silicon atoms at a bond energy of from 102 eV to 104 eV is divided into a peak area derived from the X and a peak area derived from the Y to determine the areas. The peak area at a bond energy of from 102 eV to 103 eV is derived from the Y, and the peak area at a bond energy of from 103 eV to 104 eV is derived from the X.

A sputtering rate (rate of depth to time) is measured in advance with a test piece made of PET. The respective times taken for the test piece made of PET to be cut by 2 nm, 20 nm, and 50 nm are determined. A scanning electron microscope is used for observing the depth of the cutting in the test piece made of PET. A test piece having a number-average molecular weight (Mn) of 45,000, a thickness of 5 mm, and a surface roughness (Ra) of 0.01 μm is used as the test piece made of PET.

EXAMPLES

The present disclosure is more specifically described with reference to Examples described below. However, the present disclosure is by no means limited to these Examples. The "part(s)" in the following formulations are all on a mass basis unless otherwise stated.

Production Example of Fine Particle 1

1. Hydrolysis and Polycondensation Steps (1) 43.2 g of RO water, 0.008 g of acetic acid serving as a catalyst, and 19.0 g of dimethyldimethoxysilane were loaded into a 500 mL beaker and stirred at 45° C. for 5 minutes.

(2) 28.8 g of RO water, 380.0 g of methanol, 4.0 g of 28% ammonia water, and 35.4 g of tetraethoxysilane were added to the resultant, followed by stirring at 30° C. for 3.0 hours, to thereby provide a raw material solution.

2. Particle Forming Step

Into a 2,000 mL beaker, 1,000 g of RO water was loaded and the raw material solution obtained through "1. Hydrolysis and Polycondensation Steps" described above was added dropwise over 10 minutes into the water under stirring at 25° C. After that, the mixed liquid was increased in temperature to 60° C. and stirred for 1.5 hours while the temperature was kept at 60° C. to thereby provide a dispersion liquid of fine particles each containing silicon.

3. Hydrophobizing Step

To the dispersion liquid of the fine particles each containing silicon obtained through "2. Particle Forming Step" described above, 12.0 g of hexamethyldisilazane was added as a hydrophobizing agent, and the mixture was stirred at 60° C. for 3.0 hours. After the resultant was left to stand still for 5 minutes, powder precipitated in a lower part of the solution was recovered by suction filtration and dried under reduced pressure at 120° C. for 24 hours, to thereby provide fine particle 1. The number-average particle diameter of the primary particle of the fine particle 1 was 0.12 μm. The physical properties of the fine particle 1 are shown in Table 1-1 to 1-2.

Production Example of Fine Particle 2

Fine particle 2 was obtained in the same manner as in the production example of the fine particle 1 except that: the amount of dimethyldimethoxysilane was changed to 10.9 g in (1) of "1. Hydrolysis and Polycondensation Steps" described above; and the amount of tetraethoxysilane was changed to 16.3 g and 27.2 g of trimethoxymethylsilane was added in (2) thereof. The physical properties of the resultant fine particle 2 are shown in Table 1-1 to 1-2.

Production Example of Fine Particle 3

Fine particle 3 was obtained in the same manner as in the production example of the fine particle 1 except that: the amount of dimethyldimethoxysilane was changed to 6.3 g in (1) of "1. Hydrolysis and Polycondensation Steps" described above; and the amount of tetraethoxysilane was changed to 48.1 g in (2) thereof. The physical properties of the resultant fine particle 3 are shown in Table 1-1 to 1-2.

Production Example of Fine Particle 4

Fine particle 4 was obtained in the same manner as in the production example of the fine particle 1 except that the stirring time was changed to 2.0 hours in (2) of "1. Hydrolysis and Polycondensation Steps" described above. The physical properties of the resultant fine particle 4 are shown in Table 1-1 to 1-2.

Production Example of Fine Particle 5

Fine particle 5 was obtained in the same manner as in the production example of the fine particle 1 except that the stirring time was changed to 4.0 hours in (2) of "1. Hydrolysis and Polycondensation Steps" described above. The physical properties of the resultant fine particle 5 are shown in Table 1-1 to 1-2.

Production Example of Fine Particle 6

Fine particle 6 was obtained in the same manner as in the production example of the fine particle 1 except that the stirring time was changed to 1.5 hours in (2) of "1. Hydrolysis and Poly condensation Steps" described above. The physical properties of the resultant fine particle 6 are shown in Table 1-1 to 1-2.

Production Example of Fine Particle 7

Fine particle 7 was obtained in the same manner as in the production example of the fine particle 1 except that the stirring time was changed to 4.5 hours in (2) of "1. Hydrolysis and Polycondensation Steps" described above. The physical properties of the resultant fine particle 7 are shown in Table 1-1 to 1-2.

Production Example of Fine Particle 8

Fine particle 8 was obtained in the same manner as in the production example of the fine particle 1 except that the hydrophobizing agent to be used was changed to octamethylcyclotetrasiloxane in "3. Hydrophobizing Step" described above. The physical properties of the resultant fine particle 8 are shown in Table 1-1 to 1-2.

Production Example of Fine Particle 9

Fine particle 9 was obtained in the same manner as in the production example of the fine particle 1 except that the hydrophobizing agent to be used was changed to chlorotrimethylsilane in "3. Hydrophobizing Step" described above. The physical properties of the resultant fine particle 9 are shown in Table 1-1 to 1-2.

Production Example of Fine Particle 10

Fine particle 10 was obtained in the same manner as in the production example of the fine particle 1 except that the hydrophobizing agent to be used was changed to trifluoropropyltrimethoxysilane in "3. Hydrophobizing Step" described above. The physical properties of the resultant fine particle 10 are shown in Table 1-1 to 1-2.

Production Example of Fine Particle 11

Fine particle 11 was obtained in the same manner as in the production example of the fine particle 1 except that the hydrophobizing agent to be used was changed to dimethylsilicone oil in "3. Hydrophobizing Step" described above. The physical properties of the resultant fine particle 11 are shown in Table 1-1 to 1-2.

Production Example of Fine Particle 12

Fine particle 12 was obtained in the same manner as in the production example of the fine particle 1 except that the hydrophobizing agent was not added in "3. Hydrophobizing Step" described above. The physical properties of the resultant fine particle 12 are shown in Table 1-1 to 1-2.

Production Example of Fine Particle 13

Fine particle 13 was obtained in the same manner as in the production example of the fine particle 12 except that: the amount of dimethyldimethoxysilane was changed to 4.2 g in (1) of "1. Hydrolysis and Polycondensation Steps" described above; and the amount of tetraethoxysilane was changed to 50.2 g in (2) thereof. The physical properties of the resultant fine particle 13 are shown in Table 1-1 to 1-2.

Production Example of Fine Particle 14

Fine particle 14 was obtained in the same manner as in the production example of the fine particle 12 except that the amount of 28% ammonia water was changed to 3.0 g and the stirring temperature was changed to 45° C. in (2) of "1. Hydrolysis and Polycondensation Steps" described above. The physical properties of the resultant fine particle 14 are shown in Table 1-1 to 1-2.

Production Example of Fine Particle 15

Fine particle 15 was obtained in the same manner as in the production example of the fine particle 12 except that the amount of 28% ammonia water was changed to 5.0 g and the stirring temperature was changed to 25° C. in (2) of "1.

Hydrolysis and Polycondensation Steps" described above. The physical properties of the resultant fine particle 15 are shown in Table 1-1 to 1-2.

Production Example of Fine Particle 16

Into a 2,000 mL beaker, 124.0 g of ethanol, 24.0 g of RO water, and 10.0 g of 28% ammonia water were loaded, and the temperature of the solution was adjusted to 70° C. Then, 232.0 g of tetraethoxysilane and 84.0 g of 5.4% ammonia water were both added dropwise over 0.5 hour into the solution under stirring. After the completion of the dropwise addition, hydrolysis was performed while stirring was further continued for 0.5 hour, to thereby provide a dispersion liquid of silicon polymer particles each having a siloxane bond. After 150.0 g of hexamethyldisilazane was added to the dispersion liquid of silicon polymer particles each having a siloxane bond obtained in the above-mentioned step at room temperature, the dispersion liquid was heated to from 50° C. to 60° C., followed by stirring for 3.0 hours. The powder in the dispersion liquid was recovered by suction filtration and dried under reduced pressure at 120° C. for 24 hours, to thereby provide fine particle 16. The physical properties of the resultant fine particle 16 are shown in Table 1-1 to 1-2.

Production Example of Fine Particle 17

Fine particle 17 was obtained in the same manner as in the production example of the fine particle 1 except that: 54.4 g of trimethoxymethylsilane was added instead of dimethyldimethoxysilane, the stirring temperature was changed to 30° C., and the stirring time was changed to 1.0 hour in (1) of "1. Hydrolysis and Polycondensation Steps" described above; and no tetraethoxysilane was added, the amount of RO water was changed to 98.1 g, the amount of methanol was changed to 310.7 g, the amount of 28% ammonia water was changed to 2.0 g, and the stirring time was changed to 0.5 hour in (2) thereof. The physical properties of the resultant fine particle 17 are shown in Table 1-1 to 1-2.

Production Example of Fine Particle 18

Fine particle 18 was obtained in the same manner as in the production example of the fine particle 1 except that the amount of 28% ammonia water was changed to 2.0 g and the stirring temperature was changed to 50° C. in (2) of "1. Hydrolysis and Polycondensation Steps" described above. The physical properties of the resultant fine particle 18 are shown in Table 1-1 to 1-2.

Production Example of Fine Particle 19

Fine particle 19 was obtained in the same manner as in the production example of the fine particle 1 except that the amount of 28% ammonia water was changed to 6.0 g and the stirring temperature was changed to 20° C. in (2) of "1. Hydrolysis and Polycondensation Steps" described above. The physical properties of the resultant fine particle 19 are shown in Table 1-1 to 1-2.

TABLE 1-1

| | Particle diameter | Ratio of silicon | X | | Y | | Measurement range of condition A | Measurement range of condition B | Measurement range of condition B | Measurement range of condition B |
|---|---|---|---|---|---|---|---|---|---|---|
| Fine particle No. | μm | atom % | XA | XB | YA | YB | X < Y | X > Y | Y/(X + Y) | X/Y |
| Fine particle 1 | 0.12 | 28 | 40 | 60 | 60 | 40 | Satisfied | Satisfied | 0.40 | 1.5 |
| Fine particle 2 | 0.12 | 25 | 35 | 65 | 65 | 35 | Satisfied | Satisfied | 0.35 | 1.9 |
| Fine particle 3 | 0.12 | 29 | 20 | 80 | 80 | 20 | Satisfied | Satisfied | 0.20 | 4.0 |
| Fine particle 4 | 0.12 | 28 | 40 | 60 | 60 | 40 | Satisfied | Satisfied | 0.40 | 1.5 |
| Fine particle 5 | 0.12 | 28 | 40 | 60 | 60 | 40 | Satisfied | Satisfied | 0.40 | 1.5 |
| Fine particle 6 | 0.12 | 28 | 40 | 60 | 60 | 40 | Satisfied | Satisfied | 0.40 | 1.5 |
| Fine particle 7 | 0.12 | 28 | 40 | 60 | 60 | 40 | Satisfied | Satisfied | 0.40 | 1.5 |
| Fine particle 8 | 0.12 | 28 | 40 | 60 | 60 | 40 | Satisfied | Satisfied | 0.40 | 1.5 |
| Fine particle 9 | 0.12 | 28 | 40 | 60 | 60 | 40 | Satisfied | Satisfied | 0.40 | 1.5 |
| Fine particle 10 | 0.12 | 28 | 40 | 60 | 60 | 40 | Satisfied | Satisfied | 0.40 | 1.5 |
| Fine particle 11 | 0.12 | 28 | 40 | 60 | 60 | 40 | Satisfied | Satisfied | 0.40 | 1.5 |
| Fine particle 12 | 0.12 | 28 | 40 | 60 | 60 | 40 | Satisfied | Satisfied | 0.40 | 1.5 |
| Fine particle 13 | 0.12 | 30 | 18 | 82 | 82 | 18 | Satisfied | Satisfied | 0.18 | 4.6 |
| Fine particle 14 | 0.05 | 28 | 40 | 60 | 60 | 40 | Satisfied | Satisfied | 0.40 | 1.5 |
| Fine particle 15 | 0.20 | 28 | 40 | 60 | 60 | 40 | Satisfied | Satisfied | 0.40 | 1.5 |
| Fine particle 16 | 0.12 | 30 | 100 | 100 | 0 | 0 | Not satisfied | Satisfied | 0.00 | 0.0 |
| Fine particle 17 | 0.12 | 24 | 20 | 20 | 80 | 80 | Satisfied | Not satisfied | 0.80 | 0.25 |
| Fine particle 18 | 0.03 | 28 | 40 | 60 | 60 | 40 | Satisfied | Satisfied | 0.40 | 1.5 |
| Fine particle 19 | 0.22 | 28 | 40 | 60 | 60 | 40 | Satisfied | Satisfied | 0.40 | 1.5 |

XA: a value for X at a time when a test piece made of PET is cut by 20 nm
XB: a value for X at a time when a test piece made of PET is cut by 50 nm
YA: a value for Y at a time when a test piece made of PET is cut by 20 nm
YB: a value for Y at a time when a test piece made of PET is cut by 50 nm

TABLE 1-2

| | $^{29}$Si-NMR | | | Young's modulus | Surface treatment | Degree of |
|---|---|---|---|---|---|---|
| Fine particle No. | S4/SA | S3/SA | S2/SA | Gpa | hydrophobizing agent | hydrophobicity % |
| Fine particle 1 | 0.55 | 0.00 | 0.45 | 14 | Hexamethyldisilazane | 55 |
| Fine particle 2 | 0.30 | 0.50 | 0.20 | 15 | Hexamethyldisilazane | 50 |

TABLE 1-2-continued

| Fine particle No. | $^{29}$Si-NMR S4/SA | S3/SA | S2/SA | Young's modulus Gpa | Surface treatment hydrophobizing agent | Degree of hydrophobicity % |
|---|---|---|---|---|---|---|
| Fine particle 3 | 0.85 | 0.00 | 0.15 | 25 | Hexamethyldisilazane | 62 |
| Fine particle 4 | 0.55 | 0.00 | 0.45 | 10 | Hexamethyldisilazane | 55 |
| Fine particle 5 | 0.55 | 0.00 | 0.45 | 30 | Hexamethyldisilazane | 55 |
| Fine particle 6 | 0.55 | 0.00 | 0.45 | 9 | Hexamethyldisilazane | 55 |
| Fine particle 7 | 0.55 | 0.00 | 0.45 | 31 | Hexamethyldisilazane | 55 |
| Fine particle 8 | 0.55 | 0.00 | 0.45 | 14 | Octamethylcyclotetrasiloxane | 45 |
| Fine particle 9 | 0.55 | 0.00 | 0.45 | 14 | Chlorotrimethylsilane | 45 |
| Fine particle 10 | 0.55 | 0.00 | 0.45 | 14 | Trifluoropropyltrimethoxysilane | 45 |
| Fine particle 11 | 0.55 | 0.00 | 0.45 | 14 | Dimethylsilicone oil | 45 |
| Fine particle 12 | 0.55 | 0.00 | 0.45 | 14 | Absent | 40 |
| Fine particle 13 | 0.90 | 0.00 | 0.10 | 28 | Absent | 25 |
| Fine particle 14 | 0.55 | 0.00 | 0.45 | 14 | Absent | 40 |
| Fine particle 15 | 0.55 | 0.00 | 0.45 | 14 | Absent | 40 |
| Fine particle 16 | 1.00 | 0.00 | 0.00 | 70 | Hexamethyldisilazane | 75 |
| Fine particle 17 | 0.00 | 1.00 | 0.00 | 10 | Hexamethyldisilazane | 55 |
| Fine particle 18 | 0.55 | 0.00 | 0.45 | 14 | Hexamethyldisilazane | 55 |
| Fine particle 19 | 0.55 | 0.00 | 0.45 | 14 | Hexamethyldisilazane | 55 |

| <Production Example of Polyester Resin A1> | |
|---|---|
| Polyoxypropylene(2.2)-2,2-bis(4-hydroxyphenyl)propane | 76.9 parts (0.167 mol) |
| Terephthalic acid (TPA) | 25.0 parts (0.145 mol) |
| Adipic acid | 8.0 parts (0.054 mol) |
| Titanium tetrabutoxide | 0.5 part |

The above-mentioned materials were loaded into a four-necked 4 L flask made of glass, and a temperature gauge, a stirring rod, a capacitor, and a nitrogen introduction tube were mounted on the flask. The resultant flask was placed in a mantle heater. Next, the inside of the flask was purged with a nitrogen gas, and then the temperature was gradually increased under stirring. The materials were subjected to a reaction for 4 hours under stirring at a temperature of 200° C. (first reaction step). After that, 1.2 parts (0.006 mol) of trimellitic anhydride (TMA) was added to the resultant, and the mixture was subjected to a reaction at 180° C. for 1 hour (second reaction step), to thereby provide a polyester resin A1 as a binder resin component.

The polyester resin A1 had an acid value of 5 mgKOH/g.

| <Production Example of Polyester Resin A2> | |
|---|---|
| Polyoxypropylene(2.2)-2,2-bis(4-hydroxyphenyl)propane | 71.3 parts (0.155 mol) |
| Terephthalic acid | 24.1 parts (0.145 mol) |
| Titanium tetrabutoxide | 0.6 part |

The above-mentioned materials were loaded into a four-necked 4 L flask made of glass, and a temperature gauge, a stirring rod, a capacitor, and a nitrogen introduction tube were mounted on the flask. The resultant flask was placed in a mantle heater. Next, the inside of the flask was purged with a nitrogen gas, and then the temperature was gradually increased under stirring. The materials were subjected to a reaction for 2 hours under stirring at a temperature of 200° C. After that, 5.8 parts by mass (0.030 mol %) of trimellitic anhydride was added to the resultant, and the mixture was subjected to a reaction at 180° C. for 10 hours, to thereby provide a polyester resin A2 as a binder resin component. The polyester resin A2 had an acid value of 10 mg KOH/g.

| <Production Example of Toner Particle 1> | |
|---|---|
| Polyester resin A1 | 70.0 parts |
| Polyester resin A2 | 30.0 parts |
| Fischer-Tropsch wax (peak temperature at maximum endothermic peak: 78° C.) | 5.0 parts |
| C.I. Pigment Blue 15:3 | 5.0 parts |
| Aluminum 3,5-di-t-butylsalicylate compound | 0.1 part |

The raw materials shown in the above-mentioned formulation were mixed with a Henschel mixer (Model FM-75, manufactured by Nippon Coke & Engineering Co., Ltd.) at a number of revolutions of 20 $s^{-1}$ for a time of revolution of 5 minutes. After that, the mixture was kneaded with a twin screw kneader (Model PCM-30 manufactured by Ikegai Corporation) set to a temperature of 125° C. and a number of revolutions of 300 rpm. The resultant kneaded product was cooled and coarsely crushed with a hammer mill to a diameter of 1 mm or less, to thereby provide a coarsely crushed product. The resultant coarsely crushed product was finely pulverized with a mechanical pulverizer (T-250, manufactured by Freund-Turbo Corporation). Further, the finely pulverized product was classified with a rotary classifier (200TSP, manufactured by Hosokawa Micron Corporation) to provide toner particle 1. The operating condition of the rotary classifier (200TSP, manufactured by Hosokawa Micron Corporation) was as follows: classification was performed at a number of revolutions of a classification rotor of 50.0 $s^{-1}$. The resultant toner particle 1 had a weight-average particle diameter (D4) of 5.9 μm.

| <Production Example of Toner 1> | |
|---|---|
| Toner particle 1 | 100 parts |
| Fine particle 1 | 6.0 parts |

The above-mentioned materials were mixed with a Henschel mixer Model FM-10C (manufactured by Mitsui Miike Machinery Company, Limited) at a number of revolutions of 30 $s^{-1}$ for a time of revolution of 10 min to provide a toner particle mixture 1.

(Heat Treatment Step)

The resultant toner particle mixture 1 was subjected to heat treatment with the surface treatment apparatus illustrated in FIG. 1 to provide a toner 1. The physical properties of the toner 1 are shown in Table 2. Operating conditions for the heat treatment were set as follows: a feeding amount was 2 kg/hr, a hot air temperature was 150° C., a hot air flow rate was 6 $m^3$/min, a cold air temperature was −5° C., a cold air flow rate was 2.5 $m^3$/min, a blower air flow rate was 11 $m^3$/min, and an injection air flow rate was 1 $m^3$/min.

Production Examples of Toners 2 to 25

Toners 2 to 25 were obtained by performing production in the same manner as in the production example of the toner 1 except that the toner particles, the fine particles, the presence or absence of performance of the hot air treatment step, and the hot air temperature in the heat treatment step were changed to those shown in Table 2. The physical properties of the toners 2 to 25 are shown in Table 2.

Magnetite treated with the above-mentioned silane compound: 26% by mass

The above-mentioned materials, 5 parts of a 28% by mass aqueous ammonia solution, and 20 parts of water were placed in a flask. While the contents were stirred and mixed, the temperature was increased to 85° C. in 30 minutes and held to perform a polymerization reaction for 3 hours to cure a produced phenol resin. After that, the cured phenol resin was cooled to 30° C., and water was added. After that, the supernatant liquid was removed, and the precipitate was washed with water and then air-dried. Then, the air-dried product was dried under reduced pressure (5 mmHg or less) at a temperature of 60° C. to provide a spherical carrier 1 of a magnetic material dispersion type. The 50% particle diameter (D50) on a volume basis of the carrier 1 was 34.2 μm.

TABLE 2

| | | Fine particle | | Presence or absence | | |
|---|---|---|---|---|---|---|
| Toner No. | Toner particle No. | Fine particle No. | Addition amount (number of parts) | of performance of heat treatment step | Hot air temperature (° C.) | Sticking rate (%) |
| Toner 1 | Toner particle 1 | Fine particle 1 | 6.0 | Present | 150 | 75 |
| Toner 2 | Toner particle 1 | Fine particle 1 | 6.0 | Present | 125 | 55 |
| Toner 3 | Toner particle 1 | Fine particle 1 | 6.0 | Absent | — | 45 |
| Toner 4 | Toner particle 1 | Fine particle 1 | 0.2 | Absent | — | 45 |
| Toner 5 | Toner particle 1 | Fine particle 1 | 18.0 | Absent | — | 45 |
| Toner 6 | Toner particle 1 | Fine particle 1 | 21.0 | Absent | — | 45 |
| Toner 7 | Toner particle 1 | Fine particle 1 | 0.05 | Absent | — | 45 |
| Toner 8 | Toner particle 1 | Fine particle 2 | 6.0 | Absent | — | 45 |
| Toner 9 | Toner particle 1 | Fine particle 3 | 6.0 | Absent | — | 48 |
| Toner 10 | Toner particle 1 | Fine particle 4 | 6.0 | Absent | — | 45 |
| Toner 11 | Toner particle 1 | Fine particle 5 | 6.0 | Absent | — | 45 |
| Toner 12 | Toner particle 1 | Fine particle 6 | 6.0 | Absent | — | 45 |
| Toner 13 | Toner particle 1 | Fine particle 7 | 6.0 | Absent | — | 45 |
| Toner 14 | Toner particle 1 | Fine particle 8 | 6.0 | Absent | — | 45 |
| Toner 15 | Toner particle 1 | Fine particle 9 | 6.0 | Absent | — | 45 |
| Toner 16 | Toner particle 1 | Fine particle 10 | 6.0 | Absent | — | 45 |
| Toner 17 | Toner particle 1 | Fine particle 11 | 6.0 | Absent | — | 45 |
| Toner 18 | Toner particle 1 | Fine particle 12 | 6.0 | Absent | — | 45 |
| Toner 19 | Toner particle 1 | Fine particle 13 | 6.0 | Absent | — | 48 |
| Toner 20 | Toner particle 1 | Fine particle 14 | 6.0 | Absent | — | 45 |
| Toner 21 | Toner particle 1 | Fine particle 15 | 6.0 | Absent | — | 45 |
| Toner 22 | Toner particle 1 | Fine particle 16 | 6.0 | Absent | — | 55 |
| Toner 23 | Toner particle 1 | Fine particle 17 | 6.0 | Absent | — | 45 |
| Toner 24 | Toner particle 1 | Fine particle 18 | 6.0 | Absent | — | 45 |
| Toner 25 | Toner particle 2 | Fine particle 19 | 6.0 | Absent | — | 45 |

Production Example of Carrier 1

Magnetite having a number-average particle diameter of 0.30 μm (magnetization intensity under a magnetic field of 1,000/4π (kA/m) of 65 $Am^2$/kg)

Magnetite having a number-average particle diameter of 0.50 μm (magnetization intensity under a magnetic field of 1,000/4π (kA/m) of 65 $Am^2$/kg)

To each of the above-mentioned materials, 4.0 parts of a silane compound (3-(2-aminoethylaminopropyl)trimethoxysilane) was added, and the mixture was subjected to high-speed mixing and stirring at 100° C. or more in a vessel to treat fine particles of each material.

Phenol: 10% by mass

Formaldehyde solution: 6% by mass (formaldehyde: 40% by mass, methanol: 10% by mass, water: 50% by mass)

Magnetite treated with the above-mentioned silane compound: 58% by mass

Production Example of Two-Component Developer 1

To 92.0 parts of the carrier 1, 8.0 Parts of the toner 1 was added and the contents were mixed with a V-type mixer (V-20 manufactured by Seishin Enterprise Co., Ltd.) to provide a two-component developer 1.

Production Examples of Two-Component Developers 2 to 25

Two-component developers 2 to 25 were obtained by performing production in the same manner as in the production example of the two-component developer 1 except that the toner was changed as shown in Table 3.

TABLE 3

| Two-component developer No. | Toner No. | Carrier No |
|---|---|---|
| Two-component developer 1 | Toner 1 | Carrier 1 |
| Two-component developer 2 | Toner 2 | Carrier 1 |

TABLE 3-continued

| Two-component developer No. | Toner No. | Carrier No |
|---|---|---|
| Two-component developer 3 | Toner 3 | Carrier 1 |
| Two-component developer 4 | Toner 4 | Carrier 1 |
| Two-component developer 5 | Toner 5 | Carrier 1 |
| Two-component developer 6 | Toner 6 | Carrier 1 |
| Two-component developer 7 | Toner 7 | Carrier 1 |
| Two-component developer 8 | Toner 8 | Carrier 1 |
| Two-component developer 9 | Toner 9 | Carrier 1 |
| Two-component developer 10 | Toner 10 | Carrier 1 |
| Two-component developer 11 | Toner 11 | Carrier 1 |
| Two-component developer 12 | Toner 12 | Carrier 1 |
| Two-component developer 13 | Toner 13 | Carrier 1 |
| Two-component developer 14 | Toner 14 | Carrier 1 |
| Two-component developer 15 | Toner 15 | Carrier 1 |
| Two-component developer 16 | Toner 16 | Carrier 1 |
| Two-component developer 17 | Toner 17 | Carrier 1 |
| Two-component developer 18 | Toner 18 | Carrier 1 |
| Two-component developer 19 | Toner 19 | Carrier 1 |
| Two-component developer 20 | Toner 20 | Carrier 1 |
| Two-component developer 21 | Toner 21 | Carrier 1 |
| Two-component developer 22 | Toner 22 | Carrier 1 |
| Two-component developer 23 | Toner 23 | Carrier 1 |
| Two-component developer 24 | Toner 24 | Carrier 1 |
| Two-component developer 25 | Toner 25 | Carrier 1 |

Example 1

<Method of Evaluating Toner>

A reconstructed machine of a full-color copying machine imagePRESS C800 manufactured by Canon Inc. was used as an image forming apparatus, and the two-component developer 1 was loaded into the developing unit of a cyan station. As the reconstructed points of the apparatus, changes were made so that its fixation temperature and process speed, the DC voltage VDC of a developer bearing member, the charging voltage VD of an electrostatic latent image-bearing member, and the laser power could be freely set. Image output evaluation was performed as follows: an FFh image (solid image) having a desired image ratio was output and subjected to evaluations to be described later with the VDC, the VD, and the laser power being adjusted so as to achieve a desired toner laid-on level on the FFh image on paper.

FFh is a value obtained by representing 256 gradations in hexadecimal notation, 00 h represents the first gradation (white portion) of the 256 gradations, and FFh represents the 256th gradation (solid portion) of the 256 gradations.

The evaluations were performed based on the following evaluation methods, and the results are shown in Table 4.

(1) Method of Evaluating Transferability to Embossed Paper (Emboss Transferability)

Paper: LEATHAC 66 (302.0 g/m$^2$)

(embossed paper manufactured by and available from Tokushu Tokai Paper Co., Ltd.)

Toner laid-on level on paper: 0.70 mg/cm$^2$ (FFh image)

(toner laid-on level on paper recognized in advance through use of mondi color copy paper (250.0 g/m$^2$) (available from Mondi plc), adjusted based on the DC voltage VDC of a developer bearing member, the charging voltage VD of an electrostatic latent image-bearing member, and the laser power)

Evaluation image: an image arranged over the entire surface of A4 paper of LEATHAC 66

Fixation test environment: normal-temperature and normal-humidity environment (temperature of 23° C./humidity of 50% RH (hereinafter referred to as "N/N"))

Fixation temperature: 180° C.

Process speed: 173 mm/sec

The above-mentioned evaluation image was output, and emboss transferability was evaluated. The standard deviation of luminance was used as an indicator for the evaluation of the emboss transferability. The image was read through use of a scanner (product name: CanoScan 9000F, manufactured by Canon Inc.) at a reading resolution of 1,200 dpi under the condition that image correction processing was turned off, and trimming was performed in a range of 2,550 pixels×2,550 pixels (about 10.8×10.8 cm). Subsequently, a luminance value histogram (vertical axis: frequency (number of pixels), horizontal axis: luminance, luminance values were represented in a range of from 0 to 255) of the above-mentioned image data was obtained. In addition, the standard deviation of luminance in the image data was determined based on the resultant luminance value histogram. The above-mentioned test was performed under a normal-temperature and normal-humidity environment (N/N; temperature: 25° C., relative humidity: 55%) and a normal-temperature and low-humidity environment (N/L; temperature: 25° C., relative humidity: 10%). Ranking was performed based on the following criteria, and C or higher was determined to be satisfactory. Image processing software "ImageJ" was used for calculating the standard deviation of luminance.

(Evaluation Criteria: Standard Deviation of Luminance)

A: Less than 2.0

B: 2.0 or more and less than 4.0

C: 4.0 or more and less than 6.0

D: 6.0 or more and less than 8.0

E: 8.0 or more and less than 10.0

(2) Measurement of Change in Image Density

As evaluation paper, plain paper GF-C081 (A4, basis weight: 81.4 g/m$^2$, available from Canon Marketing Japan Inc. was used.

The toner laid-on level on paper in an FFh image (solid image) was adjusted to be 0.45 mg/cm$^2$. First, an image output test on 10,000 sheets was performed at an image ratio of 80%. During the continuous passage of 10,000 sheets, sheet passage was performed under the same development condition and the transfer condition (without calibration) as those of the first sheet.

The above-mentioned test was performed under a normal-temperature and normal-humidity environment (N/N; temperature: 25° C., relative humidity: 55%) and a high-temperature and high-humidity environment (H/H; temperature: 30° C., relative humidity: 80%). Measurement of an initial density (first sheet) and the density of an image on the 10,000th sheet in printing at an image ratio of 80% was performed through use of an X-Rite color reflectance densitometer (500 series: manufactured by X-Rite Inc.), and ranking was performed based on the following criteria through use of a difference A between the densities. C or higher was determined to be satisfactory.

(Evaluation Criteria: Image Density Difference A)

A: less than 0.02

B: 0.02 or more and less than 0.05

C: 0.05 or more and less than 0.10

D: 0.10 or more and less than 0.15

E: 0.15 or more

Examples 2 to 21

The two-component developers 2 to 21 were each evaluated in the same manner as in Example 1. The evaluation results of Examples 2 to 21 are shown in Table 4.

Comparative Examples 1 to 4

The two-component developers 22 to 25 were each evaluated in the same manner as in Example 1. The evaluation results of Comparative Examples 1 to 4 are shown in Table 4.

TABLE 4

| | | Emboss transferability | | | | Change in image density | | | |
|---|---|---|---|---|---|---|---|---|---|
| | | NN | | NL | | NN | | HH | |
| | Two-component developer No. | Standard deviation | Rank | Standard deviation | Rank | Δ | Rank | Δ | Rank |
| Example 1 | Two-component developer 1 | 1.0 | A | 1.2 | A | 0.01 | A | 0.01 | A |
| Example 2 | Two-component developer 2 | 1.5 | A | 2.0 | B | 0.01 | A | 0.02 | A |
| Example 3 | Two-component developer 3 | 1.8 | A | 2.5 | B | 0.01 | A | 0.02 | A |
| Example 4 | Two-component developer 4 | 1.8 | A | 2.5 | B | 0.02 | A | 0.03 | B |
| Example 5 | Two-component developer 5 | 1.8 | A | 2.5 | B | 0.01 | A | 0.03 | B |
| Example 6 | Two-component developer 6 | 1.8 | A | 2.5 | B | 0.03 | B | 0.04 | B |
| Example 7 | Two-component developer 7 | 2.1 | B | 2.5 | B | 0.01 | A | 0.04 | B |
| Example 8 | Two-component developer 8 | 1.8 | A | 2.5 | B | 0.01 | A | 0.04 | B |
| Example 9 | Two-component developer 9 | 2.3 | B | 2.8 | B | 0.01 | A | 0.03 | B |
| Example 10 | Two-component developer 10 | 1.8 | A | 2.5 | B | 0.03 | B | 0.04 | B |
| Example 11 | Two-component developer 11 | 1.8 | A | 2.5 | B | 0.03 | B | 0.04 | B |
| Example 12 | Two-component developer 12 | 2.1 | B | 2.5 | B | 0.03 | B | 0.04 | B |
| Example 13 | Two-component developer 13 | 2.3 | B | 2.5 | B | 0.03 | B | 0.04 | B |
| Example 14 | Two-component developer 14 | 2.3 | B | 2.5 | B | 0.01 | A | 0.04 | B |
| Example 15 | Two-component developer 15 | 2.3 | B | 2.5 | B | 0.01 | A | 0.04 | B |
| Example 16 | Two-component developer 16 | 2.3 | B | 2.5 | B | 0.01 | A | 0.04 | B |
| Example 17 | Two-component developer 17 | 2.3 | B | 2.5 | B | 0.01 | A | 0.04 | B |
| Example 18 | Two-component developer 18 | 2.3 | B | 2.5 | B | 0.03 | B | 0.06 | C |
| Example 19 | Two-component developer 19 | 2.3 | B | 4.0 | C | 0.03 | B | 0.06 | C |
| Example 20 | Two-component developer 20 | 2.3 | B | 4.1 | C | 0.03 | B | 0.06 | C |
| Example 21 | Two-component developer 21 | 2.3 | B | 4.5 | C | 0.03 | B | 0.06 | C |
| Comparative Example 1 | Two-component developer 22 | 5.0 | C | 8.0 | E | 0.12 | D | 0.15 | E |
| Comparative Example 2 | Two-component developer 23 | 4.8 | C | 8.2 | E | 0.12 | D | 0.15 | E |
| Comparative Example 3 | Two-component developer 24 | 5.5 | C | 8.1 | E | 0.12 | D | 0.15 | E |
| Comparative Example 4 | Two-component developer 25 | 6.2 | D | 8.5 | E | 0.12 | D | 0.15 | E |

When the fine particle of the present disclosure is used as an external additive for a toner, the charging stability and durable stability of the toner are improved, and the contamination of a member by the toner is reduced, with the result that an image of high quality can be stably obtained over a long period of time.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-021764, filed Feb. 16, 2022, and Japanese Patent Application No. 2023-002946, filed Jan. 12, 2023, which are hereby incorporated by reference herein in their entirety.

What is claimed is:

1. A fine particle containing silicon, wherein the fine particle has a number-average particle diameter of a primary particle of 0.05 μm or more and 0.20 μm or less, wherein the fine particle contains a silicon atom at a ratio of 20% or more with respect to all elements in measurement by X-ray fluorescence (XRF), and wherein, regarding a ratio of the silicon atom measured under etching the fine particle by irradiation with an Ar-Kα ray in analysis by X-ray photoelectron spectroscopy (XPS), when a ratio of a silicon atom having following structure (a) is represented by X, and a sum of ratios of silicon atoms having following structures (b) to (d) is represented by Y, (i) a relationship of $X<Y$ is always satisfied in a measurement range of following condition A, and (ii) there is a point at which the relationship of $X<Y$ is changed to a relationship of $X>Y$, and the relationship of $X>Y$ is always satisfied after the change, in a measurement range of following condition B:

Condition A: a period of time starting with a time required for cutting a test piece made of PET by a depth of 2 nm by the irradiation with the Ar-Kα ray and ending with a time required for cutting the test piece by a depth of 20 nm;

Condition B: a period of time starting with the time required for cutting the test piece made of PET by a depth of 20 nm by the irradiation with the Ar-Kα ray and ending with a time required for cutting the test piece by a depth of 50 nm:

(a)

(b)

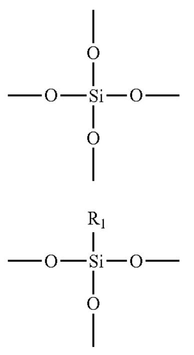

-continued (c)

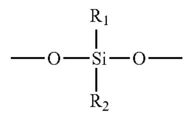

(d)

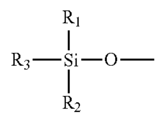

where $R_1$, $R_2$, and $R_3$ each independently represent a hydrocarbon group having 1 to 6 carbon atoms, the fine particle is a polycondensate of silicon compounds that are only bifunctional silanes and tetrafunctional silanes, a ratio of the bifunctional silanes to the sum of the bifunctional silanes and the tetrafunctional silanes is 30 mol % or more and 70 mol % or less, and the X and the Y satisfy a relationship of $0.20 \leq Y/(X+Y)$ at a point of the time required for cutting the test piece made of PET by a depth of 50 nm by the irradiation with the Ar-Kα ray.

2. The fine particle according to claim 1, wherein the X and the Y satisfy a relationship of $1.2 \leq X/Y \leq 2.0$ at a point of the time required for cutting the test piece made of PET by a depth of 50 nm by the irradiation with the Ar-Kα ray.

3. The fine particle according to claim 1, wherein the fine particle is subjected to surface treatment with at least one compound selected from an alkylsilazane compound, an alkylalkoxysilane compound, a chlorosilane compound, and silicone oil.

4. The fine particle according to claim 1, wherein the fine particle has a Young's modulus of 10 GPa or more and 30 GPa or less.

5. The fine particle according to claim 1, wherein the $R_1$, the $R_2$, and the $R_3$ in the structures (b) to (d) each independently represent an alkyl group having 1 to 6 carbon atoms.

6. A toner comprising a toner particle and a fine particle, wherein the fine particle is a fine particle containing silicon, wherein the fine particle has a number-average particle diameter of a primary particle of 0.05 μm or more and 0.20 μm or less, wherein the fine particle contains a silicon atom at a ratio of 20% or more with respect to all elements in measurement by X-ray fluorescence (XRF), and wherein, regarding a ratio of the silicon atom measured under etching the fine particle by irradiation with an Ar-Kα ray in analysis by X-ray photoelectron spectroscopy (XPS), when a ratio of a silicon atom having following structure (a) is represented by X, and a sum of ratios of silicon atoms having following structures (b) to (d) is represented by Y, (i) a relationship of $X<Y$ is always satisfied in a measurement range of following condition A, and (ii) there is a point at which the relationship of $X<Y$ is changed to a relationship of $X>Y$, and the relationship of $X>Y$ is always satisfied after the change, in a measurement range of following condition B:

Condition A: a period of time starting with a time required for cutting a test piece made of PET by a depth of 2 nm by the irradiation with the Ar-Kα ray and ending with a time required for cutting the test piece by a depth of 20 nm;

Condition B: a period of time starting with the time required for cutting the test piece made of PET by a depth of 20 nm by the irradiation with the Ar-Kα ray and ending with a time required for cutting the test piece by a depth of 50 nm:

(a)

(b)

(c)

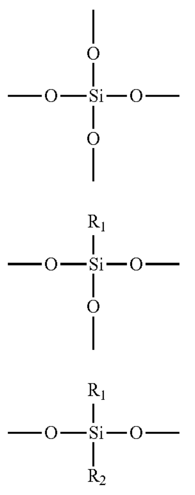

-continued (d)

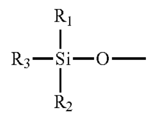

where $R_1$, $R_2$, and $R_3$ each independently represent a hydrocarbon group having 1 to 6 carbon atoms, the fine particle is a polycondensate of silicon compounds that are only bifunctional silanes and tetrafunctional silanes, a ratio of the bifunctional silanes to the sum of the bifunctional silanes and the tetrafunctional silanes is 30 mol % or more and 70 mol % or less, and the X and the Y satisfy a relationship of $0.20 \leq Y/(X+Y)$ at a point of the time required for cutting the test piece made of PET by a depth of 50 nm by the irradiation with the Ar-Kα ray.

7. The toner according to claim 6, wherein the fine particle is contained in an amount of 0.1 part by mass or more and 20.0 parts by mass or less with respect to 100 parts by mass of the toner particle.

8. The toner according to claim 6, wherein a sticking rate of the fine particle with respect to the toner particle is 50% or more.

* * * * *